United States Patent
Wang et al.

(10) Patent No.: US 10,296,219 B2
(45) Date of Patent: May 21, 2019

(54) DATA DEDUPLICATION IN A BLOCK-BASED STORAGE SYSTEM

(71) Applicant: VMware, Inc., Palo Alto, CA (US)

(72) Inventors: Wenguang Wang, Santa Clara, CA (US); Radu Berinde, Cambridge, MA (US); Christos Karamanolis, Los Gatos, CA (US); Jorge Guerra Delgado, Sunnyvale, CA (US); Srinath Premachandran, Fremont, CA (US)

(73) Assignee: VMWARE, INC., Palo Alto, CA (US)

( * ) Notice: Subject to any disclaimer, the term of this patent is extended or adjusted under 35 U.S.C. 154(b) by 669 days.

(21) Appl. No.: 14/724,392

(22) Filed: May 28, 2015

(65) Prior Publication Data

US 2016/0350325 A1 Dec. 1, 2016

(51) Int. Cl.
*G06F 3/06* (2006.01)
*G06F 16/174* (2019.01)
*G06F 17/30* (2006.01)

(52) U.S. Cl.
CPC ............ *G06F 3/0608* (2013.01); *G06F 3/065* (2013.01); *G06F 3/067* (2013.01); *G06F 3/0619* (2013.01); *G06F 3/0641* (2013.01); *G06F 16/1748* (2019.01)

(58) Field of Classification Search
CPC ......... G06F 17/30067; G06F 17/30489; G06F 2/0641; G06F 3/0641; G06F 16/1748
USPC ........ 707/692, 823, 741, 827; 711/202, 103, 711/114, 170
See application file for complete search history.

(56) References Cited

U.S. PATENT DOCUMENTS

| | | | |
|---|---|---|---|
| 7,467,167 B2 | 12/2008 | Patterson | |
| 8,037,345 B1 | 10/2011 | Iyer et al. | |
| 8,099,571 B1 * | 1/2012 | Driscoll | G06F 11/2066 707/655 |
| 8,190,835 B1 | 5/2012 | Yueh | |
| 8,190,850 B1 * | 5/2012 | Davenport | G06F 17/30067 711/170 |
| 8,442,952 B1 * | 5/2013 | Armangau | G06F 17/30159 706/14 |
| 8,478,799 B2 * | 7/2013 | Beaverson | G06F 17/30097 707/823 |
| 8,555,022 B1 * | 10/2013 | Edwards | G06F 3/0607 711/114 |
| 9,098,424 B2 * | 8/2015 | Hyde, II | G06F 12/0891 |
| 9,372,809 B2 * | 6/2016 | Testardi | G06F 11/1453 |
| 9,569,357 B1 * | 2/2017 | Shalev | G06F 11/1453 |
| 2010/0064166 A1 | 3/2010 | Dubnicki et al. | |

(Continued)

OTHER PUBLICATIONS

Article entitled: "Lustre: A Scalable, High-Performance File System"; Cluster File Systems, Inc., Lustre Whitepaper Version 1.0, Nov. 11, 2002, 13 pages.

(Continued)

*Primary Examiner* — William Spieler

(57) ABSTRACT

A method and system are disclosed for storing client data objects in a deduplicated storage system. Deduplicated data may be stored in a plurality of physical data blocks. A content map layer can provide a mapping between the physical data blocks to logical map objects associated with the client data objects. The deduplicated data may be mapped to logical data blocks that comprise the client data objects.

20 Claims, 15 Drawing Sheets

(56) References Cited

U.S. PATENT DOCUMENTS

| | | | | |
|---|---|---|---|---|
| 2010/0332479 | A1* | 12/2010 | Prahlad | G06F 17/302 707/741 |
| 2011/0107052 | A1* | 5/2011 | Narayanasamy | G06F 3/0608 711/171 |
| 2011/0307447 | A1* | 12/2011 | Sabaa | H04L 67/2842 707/637 |
| 2012/0210095 | A1* | 8/2012 | Nellans | G06F 12/10 711/206 |
| 2012/0290629 | A1* | 11/2012 | Beaverson | G06F 17/30094 707/827 |
| 2013/0227195 | A1* | 8/2013 | Beaverson | G06F 17/30097 711/103 |
| 2013/0238832 | A1* | 9/2013 | Dronamraju | G06F 3/0608 711/103 |
| 2014/0068184 | A1* | 3/2014 | Edwards | G06F 3/0607 711/114 |
| 2014/0189270 | A1 | 7/2014 | Iwanicki et al. | |
| 2014/0310476 | A1* | 10/2014 | Kruus | G06F 12/0871 711/133 |
| 2014/0324791 | A1* | 10/2014 | Petrocelli | G06F 16/1748 707/692 |
| 2015/0134879 | A1 | 5/2015 | Zheng et al. | |
| 2015/0378931 | A1* | 12/2015 | White | G06F 3/06 711/6 |
| 2016/0202916 | A1 | 7/2016 | Cui et al. | |

OTHER PUBLICATIONS

Internet article entitled: "Mac Basics: Time Machine backs up your Mac", Apple Support, Last Modified: Mar 17, 2015, 5 pages.

Internet article entitled: "Virtual SAN: Software-Defined shared Storage (SDS) for VMs", downloaded Jun. 2, 2015, 6 pages.

Internet article entitled: "Virtual Volumes (VVols) vSphere APIs & Cloning Operation Scenarios, VMware vSphere Blog—VMware Blogs", downloaded Jun. 2, 2015, 6 pages.

Gibson et al: "NASD Scalable Storage Systems", Proceedings of USENIX 1999, Linux Workshop, Monterey, CA, Jun. 9-11, 1999; 6 pages.

Jim Gray: "Notes on Data Base Operating Systems", IBM Research Laboratory, San Jose, CA, 1977, 89 pages.

Hunt et al.: "ZooKeeper: Wait-free coordination for Internet-scale systems", Yahoo, 14 pages.

Mohan et al.: "ARIES: A Transaction Recovery Method Supporting Fine-Granularity Locking and Partial Rollbacks Using Write-Ahead Logging", ACM Transactions on Database Systems, vol. 17, No. 1, Mar. 1992, 69 pages.

Palankar et al.: "Amazon S3 for Science Grids: a Viable Solution?", Computer Science and Engineering, University of South Florida and Electrical and Computer Engineering, University of British Columbia, 9 pages.

Weil et al.: "Ceph: A Scalable, High-Performance Distributed File System", USENIX Association, OSDI '06: 7th USENIX Symposium on Operating Systems Design and Implementation, 14 pages.

Weil et al.: "RADOS: A Scalable, Reliable Storage Service for Petabyte-scale Storage Clusters", University of California, Santa Cruz, 10 pages.

Data Sheet for EMC VIPR Controller, Automate and Simplify Storage Management, Realizing Software-Defined Storage with EMC VIPR, Published in the USA. Jun. 2015, Data Sheet H11750.6, 3 pages.

Office Action dated Oct. 6, 2017; U.S. Appl. No. 14/1726,572; (28 pgs.).

* cited by examiner

DATA DEDUPLICATION IN A BLOCK-BASED STORAGE SYSTEM

CROSS REFERENCE TO RELATED APPLICATION

The present disclosure is related to commonly owned, U.S. application. No. 14/726,572, filed May 31, 2019 and entitled "SNAPSHOTS AND CLONES IN A BLOCK-BASED DATA DEDUPLICATION STORAGE SYSTEM", the content of which is incorporated herein by reference in its entirety for all purposes.

BACKGROUND

Information technology (IT) organizations, both in the cloud and in enterprises, have to deal with an astonishing growth of data volume driven mostly by new generation applications and big-data use cases. Such growth pushes the scalability limits—in terms of both capacity and performance—of the most sophisticated storage platforms available. As such, enterprise storage systems use a number of technologies to reduce the footprint that data has on storage devices.

Data deduplication and cloning are two classes of technologies used to reduce the physical footprint of data. Data deduplication is a technique of eliminating duplicate copies of repeating data. Data deduplication is used to improve storage utilization. In data deduplication, unique chunks of data are identified and stored. Incoming chunks of data to be stored may be compared to stored chunks of data and if a match occurs, the incoming chunk is replaced with a small reference that points to the stored chunk (deduplicated data). Given that the same chunk of data may occur dozens, hundreds, or even thousands of times, the amount of data that must be stored can be greatly reduced.

Data deduplication and cloning allow a block of data on a physical device to be shared by more than one logical storage entities, such as files or volumes. Despite their similarities, they are usually considered as two separate approaches and are often designed and offered as completely separate features, even on the same storage platform, often not working well together. For online storage, deduplication is performed in a way that is transparent to the end user, typically as a best-effort background task. It is considered an approach appropriate for "cold" data. On the other hand, data cloning works well for "hot" data. However, it involves explicit management by the user and the effectiveness of sharing is reduced over time.

Another challenge with storage platforms relates to scalability and performance. A new generation of block-based storage systems aims at addressing this challenge, both for online use cases as well as for archival purposes. Each data object typically includes the data itself, a variable amount of metadata (attributes), and a globally unique identifier. It offers a simple read-write interface for data and metadata. In principle, these systems can offer unlimited scalability as clients can access in-parallel any number of data objects without having to go through a single data path funnel, as is the case with traditional network file systems.

However, conventional architectures make deduplication and cloning challenging. Existing systems with data space efficiency are either centralized or perform deduplication within individual devices or groups of devices. Such localized deduplication results in much lower space efficiencies. Conventional architectures do not efficiently integrate deduplication and cloning.

SUMMARY

In accordance with aspects of the present disclosure a method for storing client data objects in a storage system may include storing deduplicated data among a plurality of physical data blocks for a plurality of client data objects. Each physical data block may be associated with a hash entry object (first mapping object) that includes data fields such as a computed value computed using data stored in the physical data block, an address of the physical data block, and a reference count. Each logical data block of a client data object may be associated with a respective logical pointer entry object (second mapping object) that includes data fields such as an address of a physical data block that stores the same data as in the logical data block and a pointer to the hash entry object associated with that physical data block. The reference count in the hash entry object can indicate of how many other logical pointer entry objects point to that hash entry object.

In some aspects, the storage system is a distributed storage system, and the method may include distributing the plurality of physical data blocks among storage nodes that comprise the distributed storage system.

In some aspect, the method may include performing a SHA-1 computation on the data stored in a physical data block to compute the computed value, the computed value being a hash value resulting from the SHA-1 computation.

In some aspects, the method may include storing content map objects, where each content map object comprising a plurality of the hash entry objects. The method may include distributing the content map objects among storage nodes that comprise a distributed storage system. The method may include accessing one of the hash entry objects using a given computed value, including using a first portion of the computed value to access a content map object that includes the hash entry object.

In some aspects, the method may include distributing a plurality of the logical pointer entry objects among storage nodes that comprise a distributed storage system.

In some aspects, the storage system is a distributed storage system. The method may include both: (1) distributing the physical data blocks and a plurality of the logical pointer entry objects among storage nodes that comprise the distributed storage system and (2) storing a plurality of the hash entry objects among a plurality of content map objects and distributing the content map objects among the storage nodes.

In accordance with aspects of the present disclosure, a non-transitory computer-readable storage medium may contain instructions for controlling a computer system to store deduplicated data among a plurality of physical data blocks in a storage system, associate each physical data block with a hash entry (first mapping object). The hash entry may include a computed value computed using data stored in said each physical data block, an address of said each physical data block, and a reference count. The computer system further associates each logical data block that comprises a client data object with a respective logical pointer entry (second mapping object). The logical pointer entry may include an address of a physical data block that stores the same data as comprises the logical data block, and a pointer to the hash entry associated with the physical data block, wherein the reference count in each first mapping object indicative of how many other second mapping objects point to said each first mapping object.

In some aspects, the storage system is a distributed storage system, the computer system may distribute the plurality of physical data blocks among a plurality of storage nodes that comprise the distributed storage system.

In some aspects, the computer system may store a plurality of hash entries among a plurality of content map objects. The computer system may distribute the plurality of content map objects among a plurality of storage nodes that comprise a distributed storage system.

In some aspects, the computer system may distribute a plurality of logical pointer entries among a plurality of storage nodes that comprise a distributed storage system.

In accordance with aspects of the present disclosure, an apparatus may include one or more computer processors and a computer-readable storage medium comprising instructions for controlling the one or more computer processors to store deduplicated data among a plurality of physical data blocks in a storage system, associate each physical data block with a hash entry (first mapping object). The hash entry may include a computed value computed using data stored in said each physical data block, an address of said each physical data block, and a reference count. The one or more computer processors further associate each logical data block that comprises a client data object with a respective logical pointer entry (second mapping object). The logical pointer entry may include an address of a physical data block that stores the same data as comprises the logical data block, and a pointer to the hash entry associated with the physical data block, wherein the reference count in each first mapping object indicative of how many other second mapping objects point to said each first mapping object.

In some aspects of the present disclosure, a method for deduplicating data in a storage system may include storing a plurality of logical map objects (LMOs) comprising a plurality of logical pointer entries (LPEs). The method may further include associating an LMO with a client data object (CDO), including allocating physical data blocks from a storage system, storing data that comprise the CDO to the allocated physical data blocks, and storing addresses of the allocated physical data blocks to data address fields of respective LPEs of the associated LMO.

The method may further include deduplicating data stored in the storage system, including identifying one or more LPEs in a given LMO. For each LPE, the method may include deduplicating data stored in a given physical data block referenced in the data address field of said each LPE, by computing a hash value from the data in the given physical data block, using the hash value to access a content map object (CMO), and using the hash value to search for a hash entry (HE).

If an HE occurs in the accessed CMO, then the method may copy a data address field in the found HE to the data address field in the given LPE, store an address of the accessed CMO to a CMO address field in the given LPE, increment a reference count field in the found HE, and de-allocate the given physical data block.

If no HE is found in the accessed CMO, then the method may add an HE to the accessed CMO, copy the data address field in the given LPE to the data address field in the added HE, and set the reference count in the added HE to an initial value.

In some aspects, the method may include recording log entries of write operations made to the storage system, wherein deduplicating data stored in the storage system includes using the log entries to identify the one or more LPEs.

In some aspects, the method may include overwriting data in a logical data block of the CDO with new data, by accessing an LPE that corresponds to the logical data block. In response to an indication that data accessed by the LPE has been deduplicated, then allocating a physical data block from the plurality of physical data blocks, storing the new data to the allocated physical data block, storing original content of the accessed LPE to a log entry, updating the content of the accessed LPE by storing an address of the allocated physical data block to the data address field in the accessed LPE, and storing the updated content to the log entry. In response to an indication that the data has not been deduplicated, then storing the new data in a physical block addressed by the data address field in the accessed LPE.

In some aspects, the method may include distributing the plurality of physical data blocks and the plurality of LMOs among a plurality of storage nodes in a distributed storage system, and distributing the plurality of CMOs among the plurality of storage nodes.

The following detailed description and accompanying drawings provide a more detailed understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
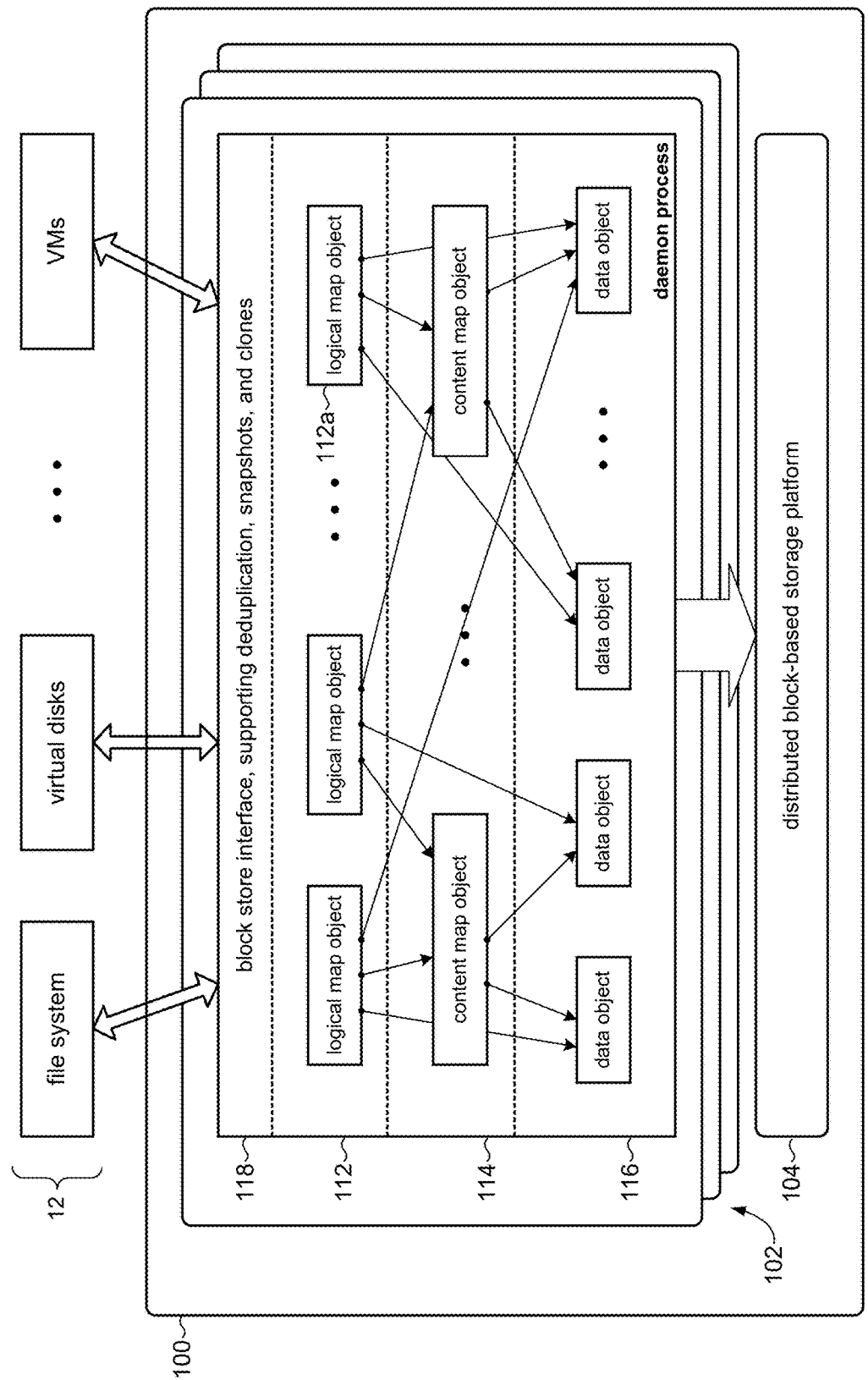
FIG. 1 shows a high level view of a deduplication storage system in accordance with the present disclosure.

Referring to FIG. 1, a deduplication storage system 100 in accordance with the present disclosure may implement a data service that can provide global data block sharing in an underlying storage platform. In some embodiments, for example, the storage system 100 may provide global data block sharing in a block-based storage platform. The storage system 100 may provide online deduplication and cloning, while retaining the scalability benefits of object storage systems. It will be appreciated, however, that storage systems in accordance with the present disclosure may be used in any suitable storage platform.

In some embodiments, the storage system 100 may include one or more host machines (hosts) 102 and a physical data storage platform 104. As noted above, in some embodiments, the storage platform 104 may be a block-based storage platform in which I/O may occur in units of fixed-sized blocks (e.g., 4 KB). Merely to illustrate, for example, the storage platform 104 may be based on the Virtual SAN™ storage system by Vmware, Inc., Virtual Volumes™ virtual storage system by Vmware, Inc., an open source storage architecture called Reliable Autonomic Distributed Object Store (RADOS), and so on. In accordance with the present disclosure, the storage system 100 is generic and makes no specific assumptions about the underlying storage platform, other than having a generic block-based read/write interface.

Higher level abstractions 12, such as file systems, virtual disks or key-value stores, virtual machines (VMs), etc. can be implemented on top of the storage system 100, as if it were any object storage. Deduplication can occur transparently, and cloning services can be exposed through suitable application programming interfaces (APIs) in an object store interface 118.

Each host 102 in the storage system 100 may include a daemon process that executes on an architecture comprising three data layers: a logical map layer 112, a content map layer 114, and a data container layer 116. Using APIs in the object store interface 118, the logical map layer 112 may expose to users (or clients) virtual data objects referred to herein as client data objects (CDOs). A client data object may be referenced by a client (e.g., a file system, virtual disk, etc.) using a unique identifier (UUID). As will become clear in the discussion that follows, client data objects may be implemented by various data objects defined and managed in the logical map layer 112, the content map layer 114, and the data container layer 116. For example, the logical map layer 112 may map a client data object to a logical map object 112a managed by the logical map layer 112. The logical map object 112a can provide access to objects in the content map layer 114 and the data container layer 116. These aspects of the present disclosure will be discussed in more detail below.

At any point in time, a client data object is "owned" by a daemon process running on one of the hosts 102. In some embodiments, the daemon process may serialize access to a given client data object made by potentially several clients. A client may access a client data object through a lookup process which connects the client to the daemon process that owns the client data object that the time. In turn, the daemon process may map the client data object (e.g., using its UUID) to a logical map object 112a in the logical map layer 112, and thus can gain access to the underlying data structures in the logical map layer 112, content map layer 114, and the data container layer 116.

The following discussion can provide some background context before giving a more detailed description of aspects of the present disclosure. In some embodiments of the present disclosure, the content map layer 114 may provide the data structures and logic to implement deduplication logic. In some embodiments, the content map layer 114 may provide and manage a global hash table that maps SHA-1 hashes of data in the logical data blocks that comprise a client data object to physical data blocks in the data container layer 116. As long as two blocks of data have the same hash, they share the same physical data block; this is the nature of deduplication.

In some embodiments, block sizes including data blocks, logical data blocks, physical data blocks, etc. are 4 KB. It will be appreciated of course that different sizes can be used. The global hash table and associated data structures may span multiple content map objects in the underlying object store, for space and performance scalability.

The data container layer 116 may provide the physical storage where all the unique data blocks are stored. data container layer 116 may utilize a number of data objects, which may be allocated dynamically as the needs of the clients and the workloads evolve.

Everything is put together by the logical map layer 112, which implements the client data object entities that are exposed to the clients. In some embodiments, a logical map object may contain data structures that implement a sparse logical address space with thin provisioning to manage and store the data of a given client data object. In some embodiments, snapshots and clones of a given client data object may be managed by the same logical map object.

The logical map object may comprise an array of pointers, where each pointer maps a 4 KB logical data block of the client data object to two locations: one, based on the hash, points to a record in the content map layer 114 that keeps track of the references to every deduplicated physical data block. That pointer can be updated during writes. The other pointer can point directly to a physical data block in the data container layer 116, and can be used for direct read access.

The discussion will now turn to a more detailed description of the data structures used in each of the three data layers 112, 114, 116. In the discussion to follow, the terms "pointer" and "address" will be understood to refer to information used to access the physical locations that contain the data of a data object. The information may be an actual address, such as an address in a memory location. The information may be structured; for example, the information may identify an object and an index or offset relative to an object in the storage node, and so on.

Figure 2:
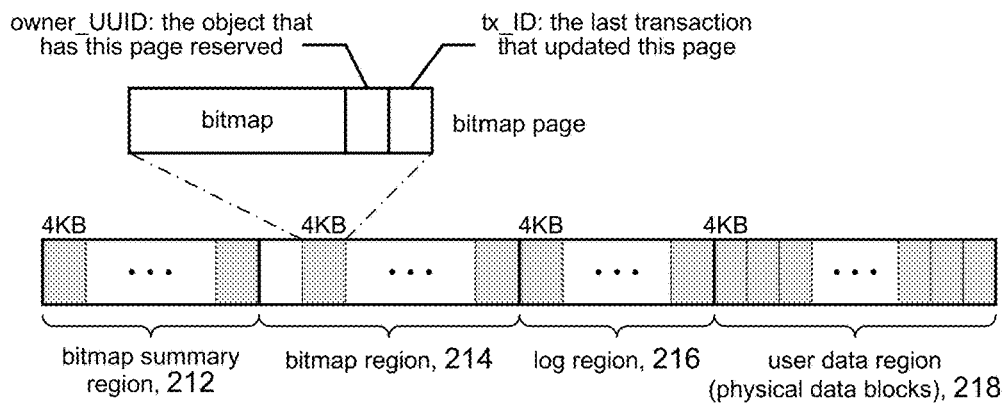
FIG. 2 shows a high level representation of a data object in accordance with the present disclosure.

Referring now to FIG. 2, a data object 202 in accordance with the present disclosure may comprise an array of 4 KB physical data blocks (user data region 218) that store the deduplicated data. The data object 202 may further comprise a bitmap data structure that manages the "free list" of physical data blocks in the user data region 218 of the data object 202. The bitmap may be implemented as a 2-level hierarchy as shown in FIG. 2. The bitmap data structure may include a bitmap summary region 212 and a bitmap region 214.

Each bit in the bitmap region 214 may indicate the allocation state of a corresponding 4 KB physical data block in the user data region 218. For example, a 2 GB bitmap is needed to manage 64 TB of data. To avoid the performance penalty of scanning such a large bitmap region 214 upon every allocation, in some embodiments a coarse bitmap summary region 212 may be used. In some embodiments, each record in the bitmap summary region 214 may be 8 bytes. The record may describe the total number of free space in the user data region 218 and the longest contiguous free area in a 4 KB bitmap page. Only the summary needs to be scanned to find the right bitmap page for space allocation. In some embodiments, for example, the size of the summary for a 2 GB bitmap may be 4 MB; thus, a full copy can be maintained in memory.

The data object 202 may include a log region 216, and in particular a write-ahead log. In some embodiments, for performance purposes, allocation operations may be made in memory (in-memory cache). The allocations may be batched and written to log entries in the log region 216 before allocations complete successfully, thus providing fast turnaround times for write operations and providing for crash recovery.

In some embodiment, such in-memory caching and write-ahead logging may be used in the logical map layer 112 and the content map layer 114 as well as in the data container layer 116. Accordingly, a brief discussion of these techniques is provided.

The storage system 100 may perform various operations on its data structures on disk (e.g., bitmap management). However, when an on-disk data structure is too large to fit in memory, the storage system 100 may employ an in-memory buffer cache to speed up accesses. The buffer cache can maintain a lookup table to quickly search for the relevant data in memory, and a replacement policy, such as Least Recently Used (LRU), may be used to decide what data should be evicted out of memory when the buffer cache is full. If the requested metadata is found in the buffer cache (e.g., a hit), an access to storage is saved. Because accesses to data usually exhibit locality, a small cache can achieve a high hit ratio and significantly improve performance.

A write-back cache is a type of in-memory buffer cache which can hold dirty data. With a write-back cache, the client of the cache can get the buffer and modify its data. Dirty data can stay in memory for a long time before it is flushed to disk later. Crash safety with write-back caching can be achieved by combining it with write-ahead logging.

On-disk data structures often consist of small units that can be updated separately, such as header blocks, hash table blocks, bitmap blocks, etc. It is common that multiple blocks need to be updated atomically during normal operations of the system. For example, when a new block is updated, the parent block that contains a pointer to the new block, the new block itself, and the relevant allocation bitmap block should all be updated on disk atomically. Since the system can crash in the middle of the update, a naïve approach of updating all blocks separately can result in an on-disk state that is inconsistent.

Write-ahead logging (WAL) is a common technique used to provide atomic and durable update to on-disk structures. In a system using WAL, all modifications to the on-disk structures are first written to a log, before they are made to their original locations. Both undo and redo information can be recorded in WAL. There are redo-undo and redo-only WAL schemes. Redo-only WAL records only the new update intended to be performed to the on-disk structures.

Redo-only WAL works by writing the data out twice: (1) all updates are written to the log, and flushed to disk; (2) all updates are written to the original location; (3) clear log entries. If the system crashes in the middle of the process, upon recovery the system reads the log entries and replays the updates to the original location. Updates to both the log and to the data structures can be coalesced to improve performance.

Figure 3:
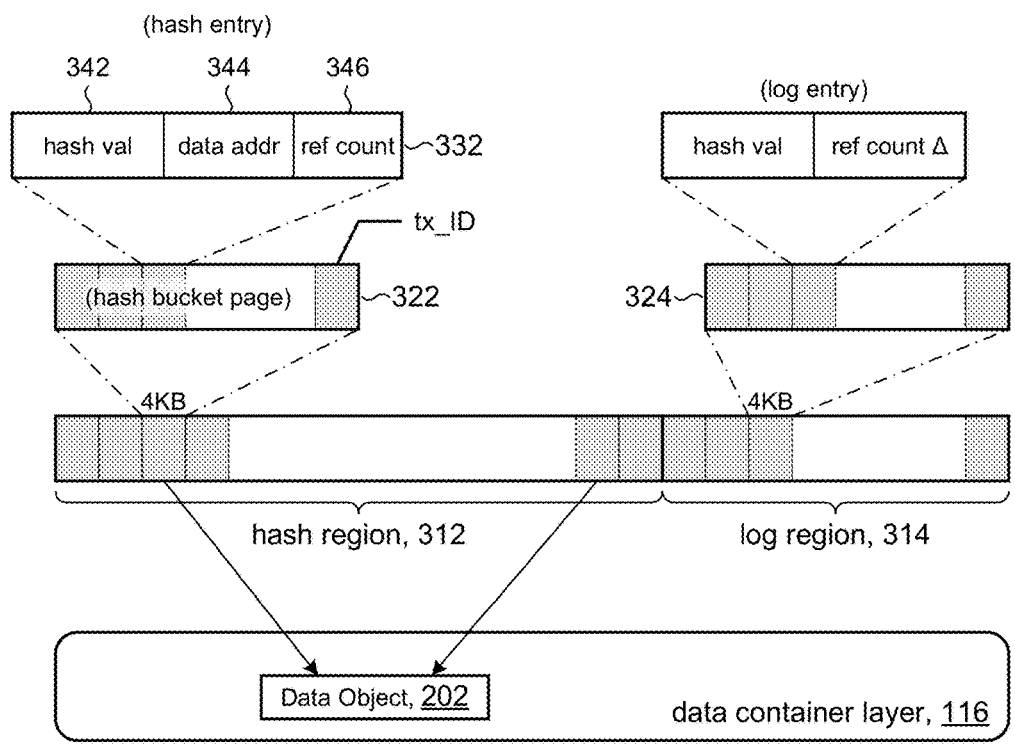
FIG. 3 shows a high level representation of a content map object in accordance with the present disclosure.

Referring now to FIG. 3, a content map object (CMO) 302 may comprise two data structures: a hash region 312 that manages a portion of the global hash table, and a log region 314 (write-ahead log). The entire global hash table may be represented by a plurality of content map objects.

In some embodiments, the hash table may comprise a fixed-size array of 4 KB hash bucket pages 322. Each hash bucket page 322 may contain an array of hash entries 332 and a transaction ID used for log replay. A hash entry (HE) 332 may comprise several data fields, including a hash value field 342, a data address field 344, and a reference count (ref count) field 346. The hash value field 342 may store a hash value computed from the data in an associated 4 KB data block. The data address field 344 may store an address of a physical data block that contains the associated 4 KB data block. The reference count field 346 may store a reference count value that indicates how many references there are to the hash entry 332.

In some embodiments, a cryptographic hash function, such as SHA-1, may be used to calculate the hash value. In some embodiments, the hash value field 342 may be 16 bytes, the data address field 344 may be 8 bytes, and the reference count field 346 may be 4 bytes. Accordingly, a 4 KB hash bucket page 322 can hold 140 hash entries 332 in some embodiments.

The content map layer 114 may use the log region 314 to ensure atomic updates of the hash bucket pages 332. An in-memory cache may be used to store every hash table update that has been written to the log but not yet replayed to the hash bucket pages 332. This aspect of the present disclosure will be discussed in more detail below.

Given the cryptographic properties of hash functions such as SHA-1, the probability of collisions can be deemed to be low enough to be ignored (i.e., orders of magnitude lower than the chances of data being corrupted on the physical medium). Moreover, the distribution of hash values across buckets is uniform. Still, there is a possibility of bucket overflow. A solution is to not deduplicate the block that would result in an overflow; for example, a flag in the logical map object may be used to mark logical data blocks that do not have an entry in the content map object. The expected frequency of bucket overflow depends on factors such as the sizing of the content map objects relative to the total physical space (i.e., expected load factor) and the number of hash entries that each has bucket page can hold. With 140 hash entries per hash bucket page and 75% load factor, the probability of a failed insert operation is less than 0.05%. It is generally acceptable to have such a small fraction of non-deduplicated data in the system. However, the sizing of the data structures can be made to accommodate lower percentages if necessary. In other embodiments, alternative approaches to handling overflow can include keeping overflow entries in the hash log.

Figure 4:
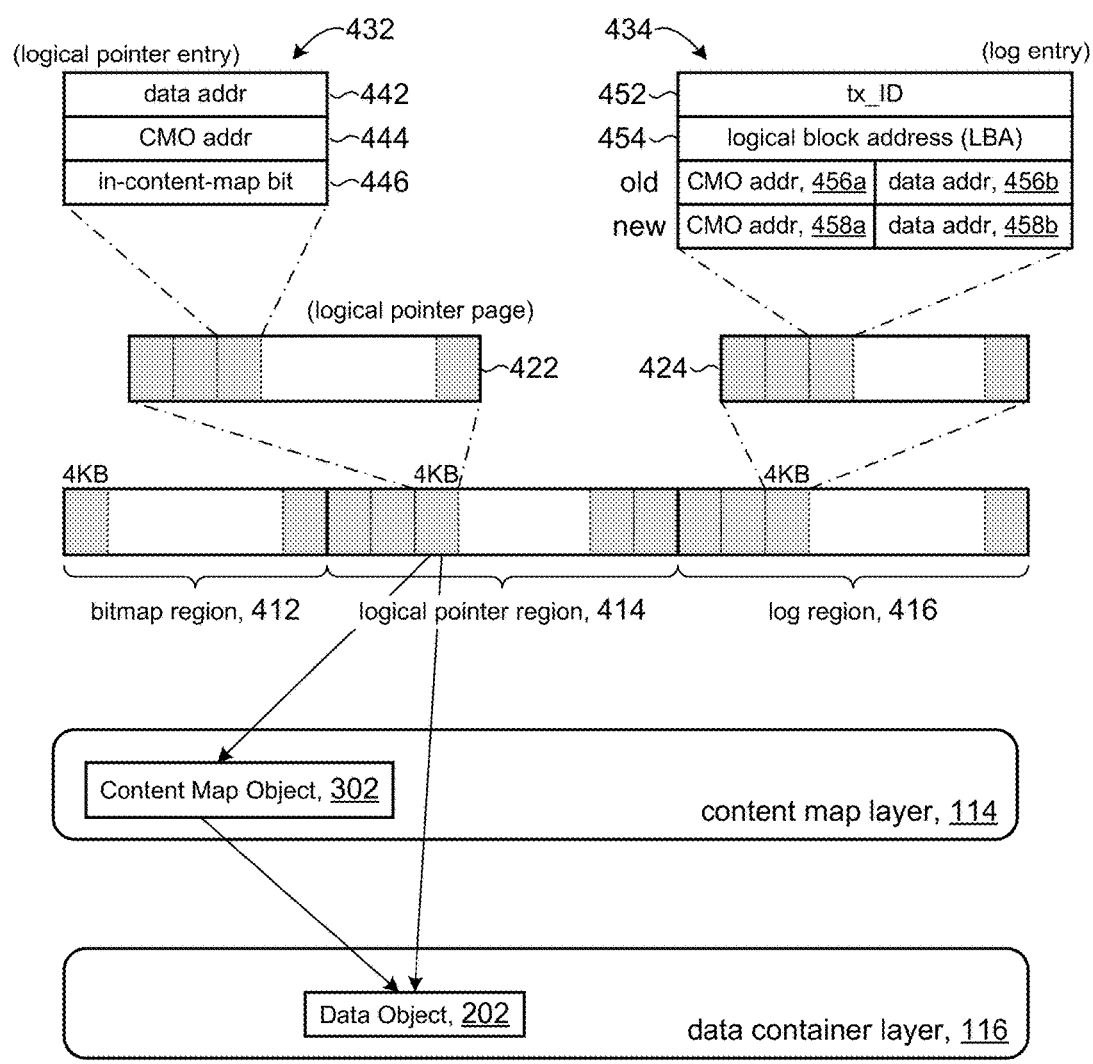
FIG. 4 shows a high level representation of a logical map object in accordance with the present disclosure.

Referring to FIG. 4, a logical map object (LMO) 402 in accordance with some embodiments may be a sparse object. The size of a logical map object 402 may be 64 TB, but can be other sizes in other embodiments. A logical map object 402 may comprise three data structures: a bitmap region 412, a logical pointer region 414, and a log region 416.

The bitmap region 412 can manage the free space in the logical pointer region 414, which comprises an array of logical pointer pages 422. In some embodiments, for example, each bit in the bitmap region 412 may correspond to each logical pointer page 422, and indicate whether the logical pointer page 422 is allocated or free.

In some embodiments, the logical pointer region 414 may comprise 512 GB of sparse space reserved for logical pointer pages 422. The underlying physical objects can be sparse and thinly provisioned, and so unused space is not wasted. The logical pointer region 414 can hold enough logical pointer entries (LPEs) 432 to represent a 64 TB logical address space (i.e., a client data object may comprise 64 TB logical data blocks). The logical pointer region 414 may be organized in 4 KB pages.

In some embodiments, each logical pointer entry 432 may comprise several data fields, including a data address field 442, a CMO address field 444, and an in-content-map bit 446. The data address field 442 may store the address of a physical data block. The CMO address field 444 may store the address of a hash entry 332 (FIG. 3). In some embodiments, the logical pointer entry 432 may be 14 bytes in size, and so each 4 KB logical pointer page 422 can store 291 such logical pointer entries 432. An in-memory write-back cache may be used to cache commonly accessed logical pointer pages 422 in memory. This can be highly effective because of the temporal and spatial locality of typical workloads.

The log region 416 may be a write-ahead log used to enforce consistency of logical pointer entries 434 (stored in log pages 424) in the presence of failures. As will be explained below, a log entry 434 may be written for a write operation. Each log entry 434 may comprise several data fields, including a transaction ID field 452, a logical block address field 454, old hash entry contents comprising a pointer to a hash entry (old) 456a and a data address of a physical data block (old) 456b, and new hash entry contents comprising a pointer to a hash entry (new) 458a and a data address of a physical data block (new) 458b. The logical block address field 454 may store the logical block address of the logical data block of a client data object that is the target of the write operation associated with the log entry 434. Operation of the old hash entry contents 456a, 456b and new hash entry contents 458a, 458b will be explained in more detail below. Briefly, the old hash entry contents 456a, 456b refer to a previous hash entry 332 pointed to by a logical pointer entry 432. The new hash entry contents 458a, 458b refer to a new hash entry 332 pointed to by a logical pointer entry 432. The log entry 434 captures both the old and new logical pointer entries 432 every time a logical pointer entry 432 is updated in order to ensure idempotency of operations during log replay. This aspect of the present disclosure will be discussed in more detail below.

To avoid bottlenecks in the content map layer 114 (FIG. 1) and the data container layer 116, the data structures may be organized as multiple objects. For example, in some embodiments, the content map layer 114 may be organized so that each content map object (e.g., 302, FIG. 3) manages a subset of the global hash table. For example, if there are 64 content map objects, the high 6 bits of the hash value may determine which object to use, and the rest of the bits may be used to choose the hash bucket within the object. Any cryptographic hash algorithm should generate uniformly distributed hash values, which means that we expect balanced loads among the content map objects.

The data container layer 116 (FIG. 1) may be similarly organized so that each data object 202 (FIG. 2) manages a subrange of the address space. Suppose, for example, that the maximum size of each data object is 64 TB (i.e., $2^{34}$ 4 KB data blocks). A 55-bit address may be used to access a 4 KB data block from among $2^{21}$ data objects; the high 21 bits may be used to identify one of the $2^{21}$ data objects, and the low 34 bits can then identify the data block from among the $2^{34}$ 4 KB data blocks in the identified data object. By allocating data blocks from all data objects in a round robin manner, it is unlikely that the I/O load will be skewed towards one "hot" object. The data objects may be distributed among the storage nodes that comprise the underlying distributed storage platform 104 (FIG. 1).

The discussion will now turn to descriptions for doing I/O (read and write operations) using the architecture described above. In order to reduce perceived I/O latency, access on the I/O path may be kept to a minimum. In general, when an I/O request (read or write) comes in, the corresponding logical pointer entries 432 (FIG. 4) for the range of logical block addresses specified in the I/O request can be retrieved from the logical map object 402 associated with the target client data object. Because I/Os usually have temporal and spatial locality, the logical pointer entries 432 are likely to be found in the in-memory cache, and the cost to retrieve the logical pointer entries 432 should be negligible. In particular, logical pointer entry accesses are amortized for large or nearby I/O requests because each logical map object 402 contains many entries for consecutive logical block addresses.

Consider, first, the processing of read requests. In order to service a read request, physical block addresses of the physical data blocks to be read may be retrieved from the logical pointer entries 432 of the logical map object 402 associated with the target client data object, and I/Os may be sent to the physical data blocks directly. Provided that the logical pointer entry accesses are negligible, the latency and throughput of read requests can approach those of the underlying object store.

Figure 5:
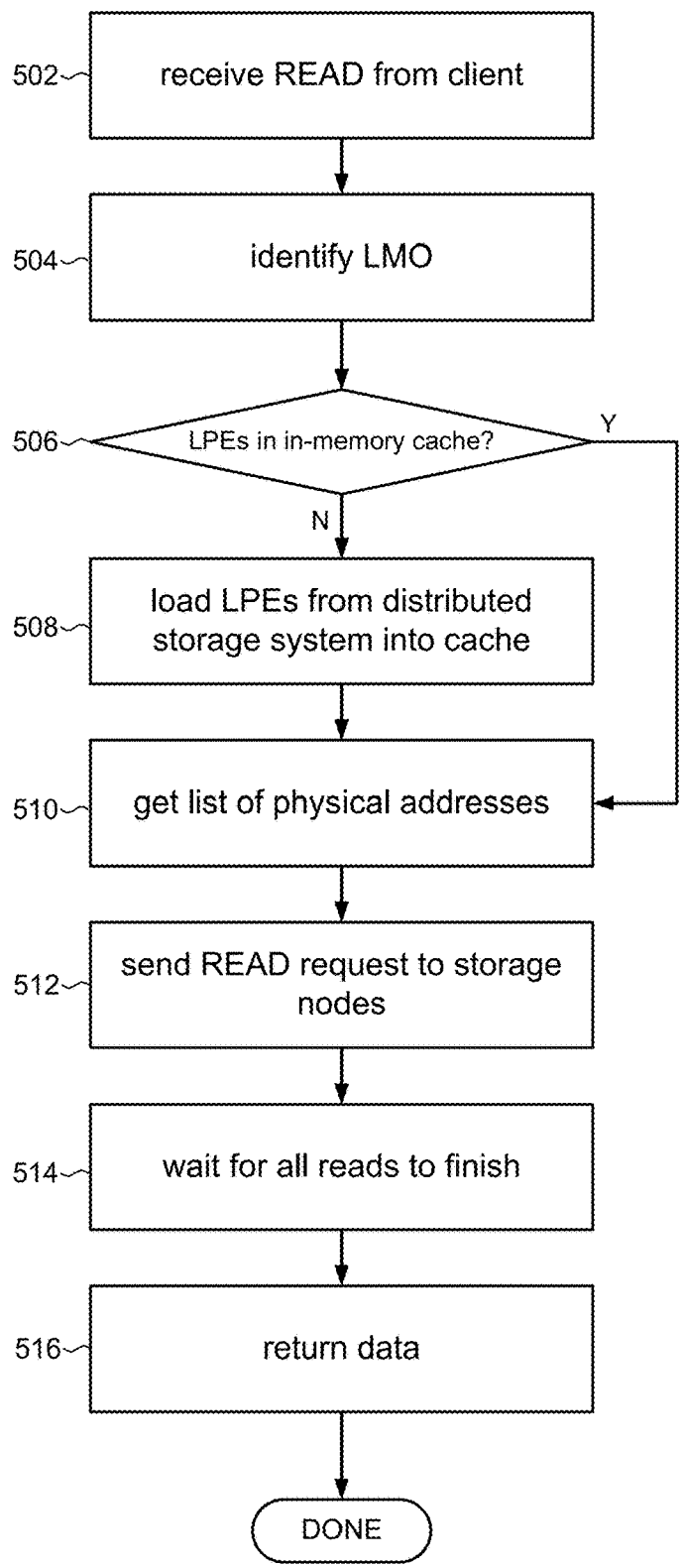
FIG. 5 represents a high level description of read processing in accordance with some embodiments of the present disclosure.

FIG. 5 shows a high level process for reading data from a client data object (CDO) from the deduplication storage system 100 (FIG. 1) in accordance with the present disclosure. In some embodiments, for example, the daemon process (e.g., running in host 102, FIG. 1) may include computer executable program code configured to operate the host to perform read processing. The discussion to follow makes references to reference numerals in the architecture shown in FIGS. 3 and 4.

At 502, the daemon process may receive a READ request from a client to read out data in a client data object. In some embodiments, the READ request may have the form: read (UUID, offset, size, buf), where UUID may identify the client data object, offset may identify an offset from the beginning of the client data object to the first byte to begin reading from, size may specify the number of data bytes to read, and buf may be a pointer to a buffer to return the data.

At 504, the daemon process may identify the logical map object (LMO) 402 associated with the client data object using the UUID. In some embodiments, an OPEN command may be used to obtain a "handle" corresponding to the UUID. The handle may be a data structure provided and used by the daemon process to access logical pointer entries 432 of the identified LMO 402.

At 506, if the logical pointer entries 432 that correspond to the requested data of the READ command of the identified LMO 402 are not already in memory, then at 508 the daemon process may load the logical pointer entries 432 from physical storage. Otherwise, the processing may proceed to 510.

At 508, the daemon process may produce a list of data addresses of the physical data blocks that contain the data of the client data object to be read out. The list of data addresses may be determined from the offset and size parameters received in the READ request. For example, a range of addresses for the logical data blocks in the client data object of the READ operation may be computed as follows:

beginning logical block address: (offset/4096)
last logical block address: (((offset+size+4095)/4096)−1)

Each logical block address can identify the logical pointer entry 432 in the accessed LMO 402 to be loaded into cache memory. In some embodiments, for example, the top n bits of the logical block address may identify a logical pointer page 422 in the accessed LMO 402, and the bottom m bits of the logical block address may identify the logical pointer entry 432 within the identified logical pointer pages 422 of the accessed LMO 402. Logical pointer entries 432 may come from different logical pointer pages 422.

At 510, the list of data addresses of the physical data blocks that contain the data to be read out can then be compiled from the logical pointer entries 432. More specifically, the data address field 442 of each logical pointer entry 432 contains the address of the physical data block to be read out.

At 512, the daemon process may send low level read requests to access the data from the physical data blocks identified by the addresses determined at 510. In some embodiments, if the physical data blocks are distributed among the different storage nodes in the underlying distributed storage platform (104, FIG. 1), the read requests may be sent out in parallel to several different storage nodes. At 514, the daemon process may collect the data that is read in from the physical data blocks. At 516, the daemon process may assemble the blocks of data read in and return the data to the client (e.g., via buf), thus completing read processing.

In some embodiments, when processing a write request, data deduplication can be deferred and occur asynchronously in the background after the I/O is completed in order to reduce write latency from the perspective of the issuer of the write request. When a write request comes in, the request may be a "new" write that adds a new logical data block to the client data object. The write request may be an "overwrite" request to overwrite data in an existing logical data block. If the corresponding logical pointer entry 432 that corresponds to the logical data block being overwritten indicates that the data already has a corresponding entry in the content map object (CMO) 302, this request may be handled like a new write because the existing data may be deemed to have been deduplicated and should not be directly overwritten. Otherwise, the data may be deemed to be not yet deduplicated and the logical data block can be safely overwritten. This will become more apparent in the discussion to follow.

Figure 6:
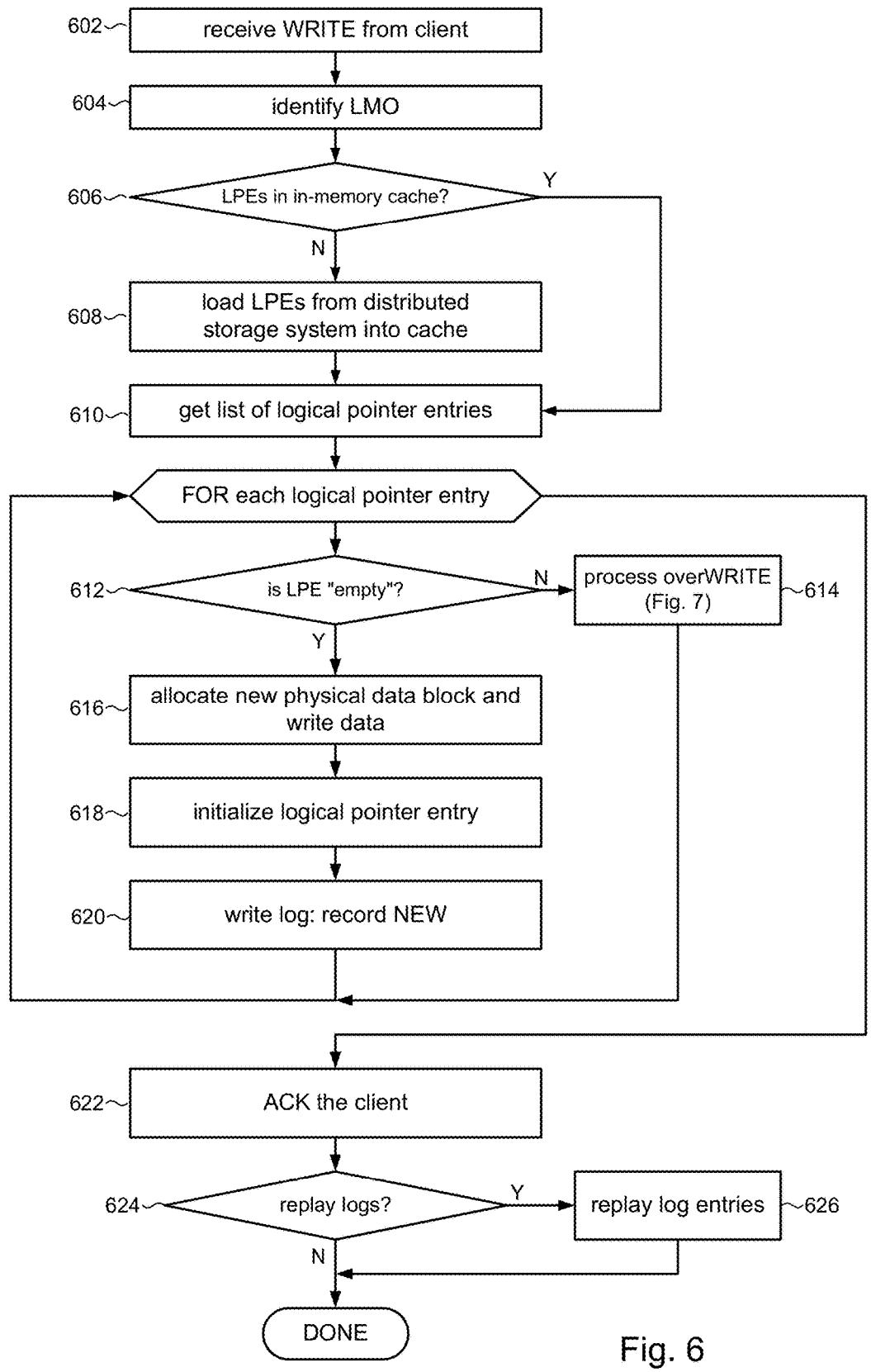
FIG. 6 represents a high level description of write processing in accordance with some embodiments of the present disclosure.

FIG. 6 shows a high level process for writing data to a client data object stored in the deduplication storage system 100 (FIG. 1) in accordance with the present disclosure. In some embodiments, for example, the daemon process (e.g., running in host 102, FIG. 1) may include computer executable program code configured to operate the host to perform write processing in accordance with the present disclosure. The discussion to follow makes references to reference numerals in the architecture shown in FIGS. 3 and 4.

At 602, the daemon process may receive a WRITE request from a client to write out data to a client data object. In some embodiments, the WRITE request may have the form: write (UUID, offset, size, buf), where UUID may identify the client data object, offset may identify an offset from the beginning of the client data object to the first byte position to begin writing to, size may specify the number of data bytes to write, and buf may be a pointer to a buffer containing the new data to be written.

At 604, the daemon process may identify the logical map object (LMO) 402 associated with the client data object using the UUID. In some embodiments, an OPEN command may be used to obtain a "handle" corresponding to the UUID. The handle may be a data structure provided and used by the daemon process to access the LMO 402 associated with the UUID.

At 606, if the logical pointer entries 432 that correspond to the target data of the WRITE command of the accessed LMO 402 are not already in memory, then at 608 the daemon process may load the logical pointer entries 432 from physical storage. Otherwise, the processing may proceed to 610.

At 608, the daemon process may compute a list of logical pointer entries 432 from the offset and size parameters received in the WRITE request. For example, a range of addresses for the logical data blocks in the client data object that are the target of the WRITE operation may be computed as follows:

beginning logical block address: (offset/4096)
last logical block address: (((offset+size+4095)/4096)−1)

Each logical block address can identify the logical pointer entry 432 in the accessed LMO 402 to be loaded into cache memory. In some embodiments, for example, the top j bits of the logical block address may identify the logical pointer page 422 in the accessed LMO 402, and the bottom k bits of the logical block address may identify the logical pointer entry 432 within the identified logical pointer entry 422 of the accessed LMO 402.

At 610, the list of logical pointer entries 432 may be compiled for the logical data blocks that are the target of the WRITE operation. Processing may proceed to the FOR loop to process each logical pointer entry 432 in the list as follows:

At 612, a determination is made whether the logical pointer entry 432 is "empty." A logical pointer entry 432 that is "empty" may be deemed to mean this is a write to a new logical block (new write) in the client data object. The logical pointer entry 432 may be "empty" in that all its data fields are zero (NULL). In some embodiments, the data address field 442 being NULL may indicate and empty logical pointer entry 432. In some embodiments, the logical pointer entry 432 may include an empty flag that is set or not set. If the logical pointer entry 432 is not "empty", then processing may proceed 614 to perform overwrite processing, which is described in more detail in FIG. 7. Otherwise, processing proceeds to 616 to perform "new write" processing.

At 616, the daemon process may allocate a new physical data block. The new data may be written directly to the allocated physical data block.

At 618, the daemon process may initialize the empty logical pointer entry 432. For example, the address of the allocated physical data block may be written to the data address field 442, the CMO address field 444 may be set to NULL, and the in-content-map bit 446 may be cleared or otherwise reset.

At 620, the daemon process may write the following information to a new log entry 434 in the log region 416 of the accessed LMO 402 corresponding to the newly initialized logical pointer entry 432:
- the old hash entry contents 465*a*, 465*b* may be NULL because there is no "old" hash entry 332 that the new logical pointer entry 432 points to
- similarly, the "new" CMO address data field 458*a* may be NULL because the new logical pointer entry 432 does not yet point to a hash entry 332
- address (new) of the allocated physical block→"new" data address data field 458*b*

Processing may return to the top of the FOR loop to process the next logical pointer entry 432.

At 622, when all the blocks have been processed, the daemon process can send an acknowledgment to the client. At 624, the daemon process may decide whether or not to replay the log entries 434. Any suitable criteria may be used to make this decision. In some embodiments, for example, if the number of log entries 434 in the log region 416 exceeds some predetermined number of entries, then the log entries 434 may be replayed at 626. Replay of the log entries will be described below. Otherwise, write processing can be deemed completed.

Figure 7:
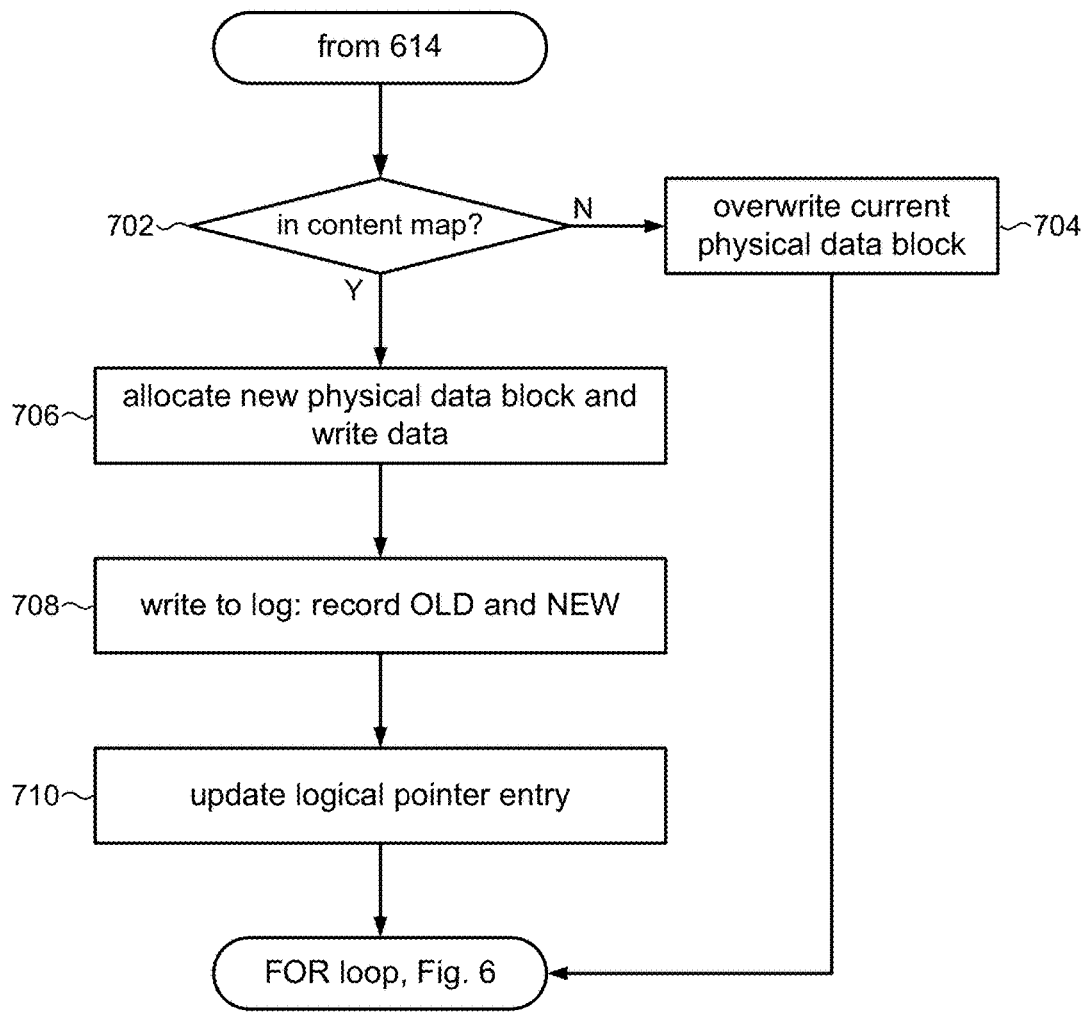
FIG. 7 represents another high level description of overwrite processing in accordance some embodiments of the present disclosure.

FIG. 7 shows a high level process for processing for "overwrites," in accordance with the present disclosure where the new data is being written to existing logical data blocks. In some embodiments, for example, the daemon process (e.g., running in host 102, FIG. 1) may include computer executable program code configured to operate the host to perform the write processing. The discussion to follow makes references to reference numerals in the architecture shown in FIGS. 3 and 4.

At 702, the daemon process may look at the in-content-map bit 446 in the logical pointer entry 432 to determine if the logical pointer entry 432 contains a valid pointer to a hash entry 332. In other embodiments, the daemon process may use the CMO address field 444 of the logical pointer entry 432 to make this determination; e.g., NULL or not NULL. If the logical pointer entry 432 does not point to a hash entry 332, then that may be deemed to indicate the data contained in the physical data block pointed to in the logical pointer entry 432 has not yet been deduplicated (not processed for deduplication), and so no other client data object comprises that particular data. Accordingly, at 704, the data contained in that physical data block can be overwritten by the new data without fear of corrupting another client data object. Processing may then return to 622 in FIG. 6.

If at 702, however, the logical pointer entry 432 contains a valid pointer to a hash entry 332, then that may be deemed to indicate the data contained in the physical data block pointed to in the logical pointer entry has been deduplicated. In other words, the data occurs in one or more other client data objects and thus should not be overwritten in order not to corrupt the one or more other client data objects. Accordingly, the data should be treated as "new" data, and at 706, the daemon process may allocate a new physical data block and write the new data to the allocated physical data block.

At 708, the daemon process may write the following information to a log entry 434 in the log region 416 of the accessed LMO 402:
- current (old) content of the CMO address field 444→old CMO address field 456*a*
- current (old) content of the data address field 442→old data address field 456*b*
- address (new) of the allocated physical data block→new data address field 458*b*

NULL may be written to new CMO address field 458*a*
Current content in the logical pointer entry 432 for the "old" hash entry pointer 332 is written to the log entry 434, and the address of the allocated physical data block for what may be the "new" hash entry pointer is written to the log entry 434. This aspect of the present disclosure will become more clear in the discussion below for replay processing.

At 710, the daemon process may update the logical pointer entry 432 by clearing the CMO address field 444 and the in-content-map bit 446. The daemon process can write the address of the allocated physical data block to the data address field 442 of the logical pointer entry 432. Processing may return to the FOR loop in FIG. 6 to process the next logical pointer entry.

The discussion will now turn to data deduplication. Data deduplication can occur asynchronously out of the I/O path. In accordance with the present disclosure, data deduplication may occur during the replay of log entries 434 in a particular LMO 402. Further in accordance with the present disclosure, the log entries 434 in a given LMO 402 are independent of the log entries 434 of other LMOs 402. Accordingly, two or more replays can take place concurrently, although serialization may occur if the same content map objects 302 or data objects 202 are being accessed from different LMOs 402.

Figure 8:
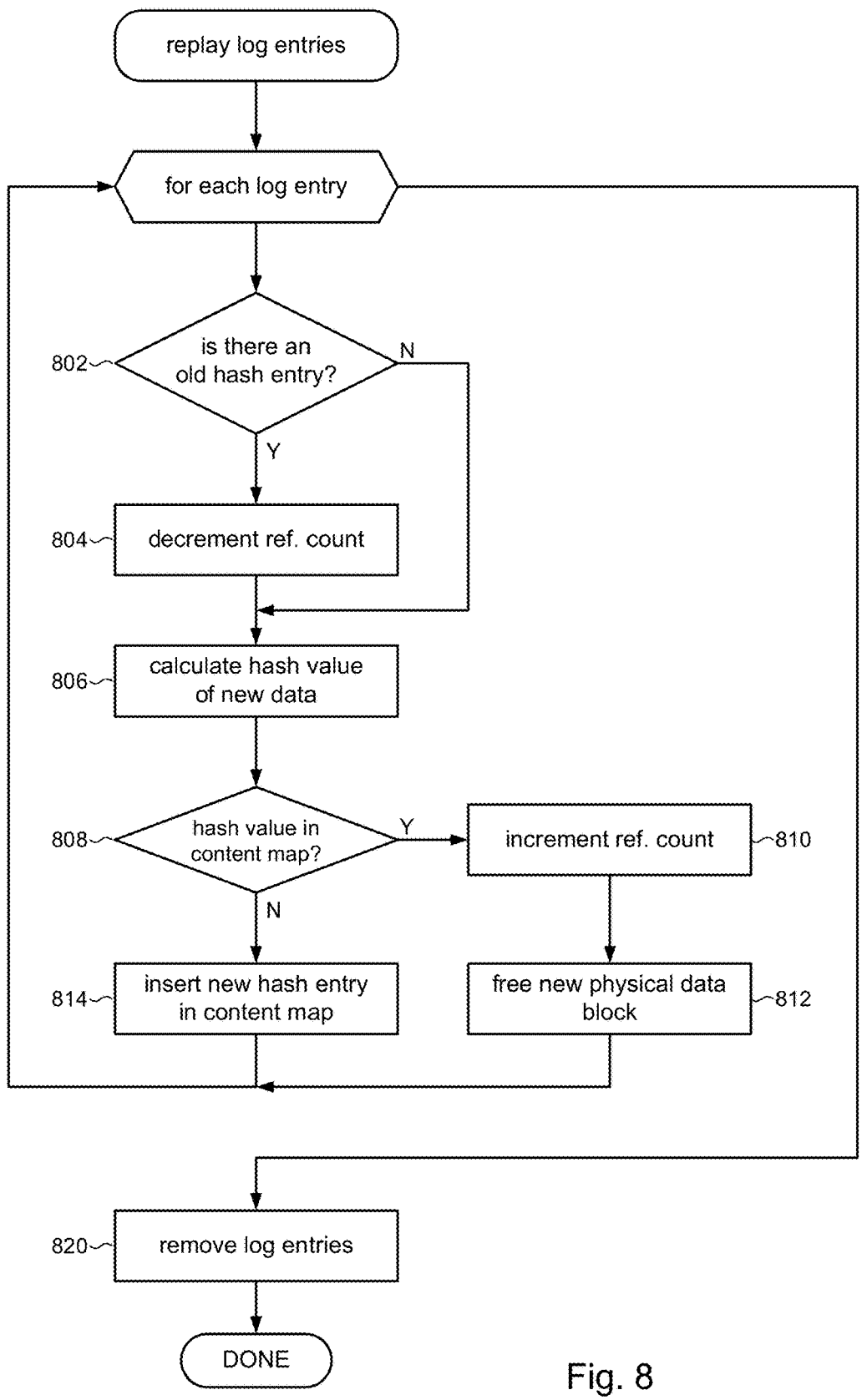
FIG. 8 represents a high level description of replay processing in accordance some embodiments of the present disclosure.

FIG. 8 shows a high level process for replaying log entries 434 (FIG. 4) in a given LMO 402 in accordance with the present disclosure. In some embodiments, for example, the daemon process (e.g., running in host 102, FIG. 1) may include computer executable program code configured to operate the host to perform replay processing. The discussion to follow makes references to reference numerals in the architecture shown in FIGS. 3 and 4. Processing may be performed in a FOR loop for each log entry 434 as follows:

The logical block address data field 454 in the log entry 434 identifies the logical data block that was the target of the write operation that resulted in the log entry 434. As explained above, the logical block address can be used to access the corresponding logical pointer entry 432. At 802, the daemon process may determine if the corresponding logical pointer entry 432 pointed to an old hash pointer 332. This determination can be made by inspecting the "old" CMO address field 456*a* in the log entry 434, NULL or not NULL. If the corresponding logical pointer entry 432 did not point to an old hash entry 332, then this means the data associated with the log entry 434 has not been processed for deduplication, and processing may proceed to 806.

If the corresponding logical pointer entry 432 did point to an old hash entry 332, then we need to reduce the reference count field 346 in that old hash entry 332 since there will now be one less logical pointer entry 432 that references the old hash entry 332. Accordingly, at 804, the daemon process may use the CMO address contained in the "old" CMO address data field 456*a* to access the old hash entry 332. In some embodiments, for example, the first i bits of the CMO address may be used to identify a content map object 302 in the content map layer 114. The remaining l bits in the CMO address may be used to identify a hash bucket page 322 in the identified content map object 302. The identified hash bucket page 322 may be searched (e.g., linear search, binary search, etc.) to identify the old hash entry 332 by matching the "old" data address field 456b in the log entry 434 against the data address field 344 of the hash entries 332 in the identified hash bucket page 322. The reference count field 346 in the identified old hash entry 332 may then be decremented.

At 806, the daemon process may process the new data for deduplication. The new data may be accessed from the "new" data address field 458b in the log entry 434. A hash value (e.g., SHA-1 hash) may be computed on the new data.

At 808, the daemon process may determine if the hash value occurs in one of the hash entries 332 among the CMOs 302 in the content map layer 114. In some embodiments, for example, the first g bits of the hash value may used to identify a content map object 302. The remaining h bits may be used to identify a hash bucket page 322 in the identified content map object 302. The identified hash bucket page 322 may be searched (e.g., linear search, binary search, etc.) to identify the hash entry 332 by matching the hash value itself against the hash value data field 342 of the hash entries 332 in the identified hash bucket page 302.

If a match is found, this means the new data already exists. Accordingly, at 810 the reference count field 346 in the identified hash entry 332 may be incremented to indicate there will be one more reference to this already existing data. The corresponding logical pointer entry 432 identified above at 802 may be updated, for example, by copying the data address field 344 in the identified hash entry 332 to the data address field 442, copying the CMO address of the identified hash entry 332 to the CMO address field 444, and setting the in-content-map bit 446. Now the corresponding logical pointer entry 432 properly points to the already existing data and to the hash entry 332 that manages the already existing data. At 812, the physical data block identified in the "new" data address field 456b of the log entry 434 may be deallocated. This completes the process of deduplication of new data that already exists.

Returning to 808, if a hash entry 332 is not found, then this means the new data is unique. Accordingly, at 814 a new hash entry 332 may be allocated and initialized. For example, the computed hash value for the new data may be copied to the hash value field 342 in the allocated hash entry 332, the "new" address data field 458b in the log entry 434 may be copied to the data address field 344 in the allocated hash entry 332, and the reference count field 346 in the allocated hash entry 332 may be initialized to one. The CMO address of the allocated hash entry 332 may be copied to the CMO address data field 444 of the corresponding logical pointer entry 432 and the in-content-map bit 446 of the corresponding logical pointer entry 432 may be set. This completes the process deduplication of new data that is unique.

At 820, the daemon process may remove the processed log entries, and the replay procedure may be deemed complete.

FIGS. 9A-9H are sequence diagrams to further illustrate the write processing and replay processing described above. The sequence diagrams show write processing on a client data object (not shown) that comprises two logical data blocks, with logical block addresses #3792 and #3795. Logical data block #3792 comprises data α, logical data block #3795 comprises data β.

Figure 9A:
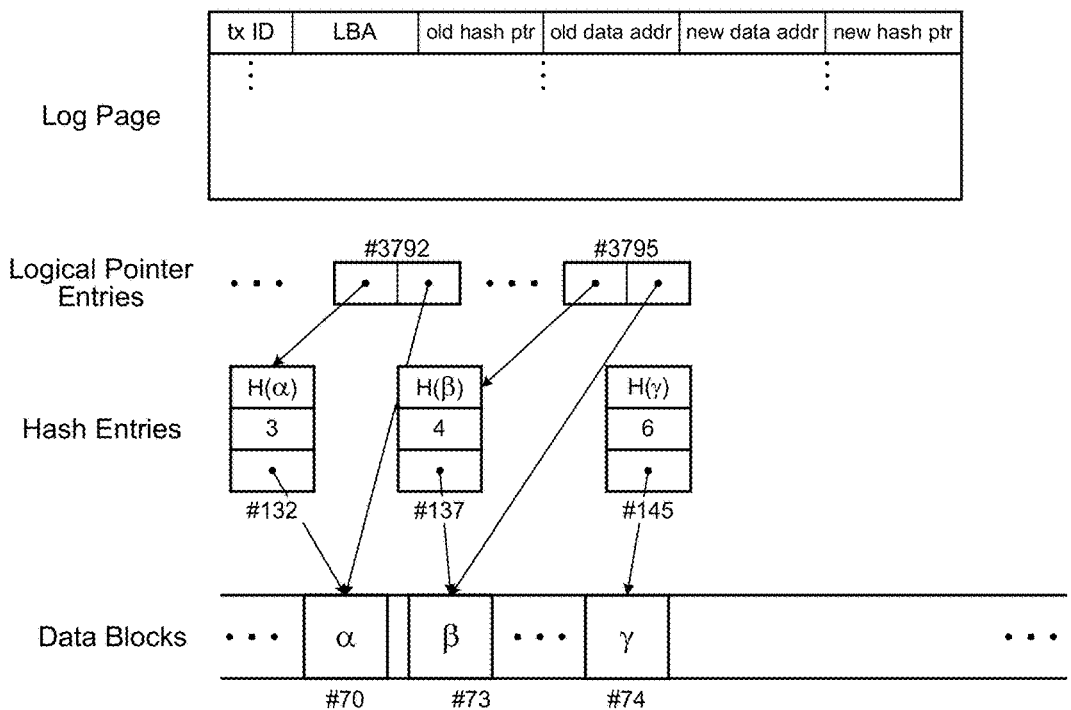
FIGS. 9A-9H represent an illustrative example of sequences showing changes to the data structures for write processing and replay processing in accordance with the present disclosure.

FIG. 9A depicts an initial data state of various data structures that support the storage of the data of logical data blocks #3792 and #3795 in accordance with the present disclosure. Two logical pointer entries corresponding to the logical data blocks #3792 and #3795 are shown. The logical pointer entry for logical data block #3792 includes a pointer (e.g., data address field 442, FIG. 4) that points to physical data block #70 (which stores data α) and a pointer (e.g., CMO address field 444) that points to hash entry #132. Similarly, the logical pointer entry for logical data block #3795 includes a pointer that points to physical data block #73 (which stores data β) and a pointer that points to hash entry #137.

The hash entry #132 includes a hash value H(α) that is computed from data α and a pointer (data address field 346) to physical data block #70 that contains data α. The reference count for hash entry #132 shows that a total of three logical pointer entries in the storage system point to this hash entry. Stated differently, data α occurs three times among data objects in the storage system, but only one copy is actually stored. Similarly, hash entry #137 includes a hash value H(β) that is computed from data β and a pointer to physical data block #73 that contains data β. The reference count for hash entry #137 shows that a total of four logical pointer entries in the storage system point to this hash entry. Stated differently, data β occurs four times among data objects in the storage system. A hash entry #145 is also depicted, including a hash value H(γ) and a pointer to physical data block #74 which stores data γ. The hash entry #145 shows that there are six instances of data γ among the data objects in the storage system.

The logical pointer entries #3792 and #3795 occur in a logical map object (not shown) that corresponds to the client data object comprising logical data blocks #3792 and #3795. FIG. 9A shows the log page of log entries associated with the logical map object.

Figure 9B:
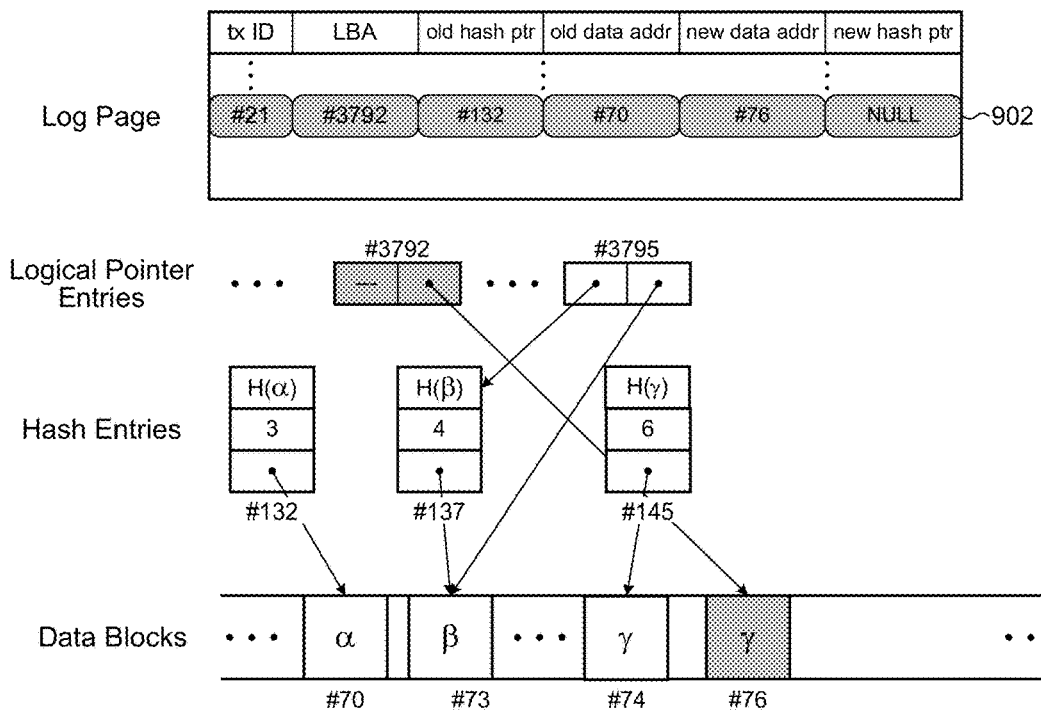

FIG. 9B illustrates the data state after processing a write request. The figure represents an example of an overwrite operation that includes data γ and specifies logical data block #3792 as the target of the write operation. In accordance with the processing shown in FIG. 7, FIG. 9B shows that physical data block #76 has been allocated and data γ written to the allocated physical data block. A log entry 902 has been added to the log page. The log entry 902 identifies logical block address #3792 as the target of the write operation. Old data contained in logical pointer entry #3792 is written in the log entry 902, namely old hash entry #132 and physical data address #70. Updates to logical pointer entry #3792 are also reflected in the log entry 902, namely logical pointer entry #3792 now points to physical data address #76 and the hash pointer is set to NULL.

Figure 9C:
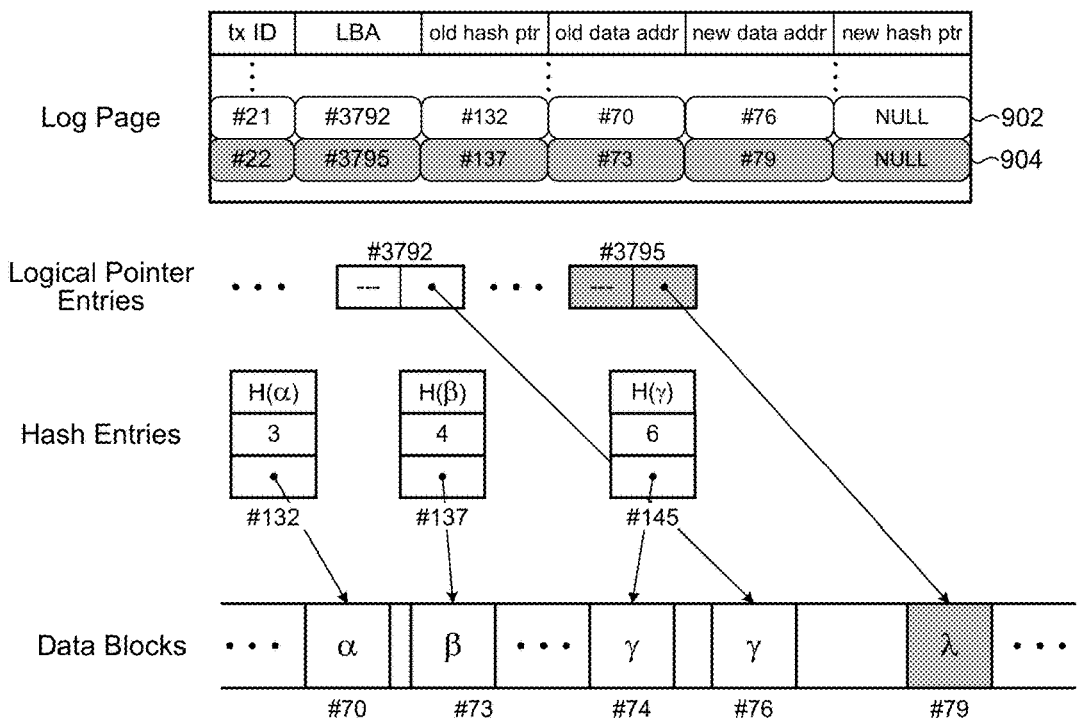

FIG. 9C illustrates the data state after processing another write request. The figure represents another example of an overwrite operation that includes data λ and specifies logical data block #3795 as the target of the write operation. In accordance with the processing shown in FIG. 7, FIG. 9C shows that physical data block #79 has been allocated and data λ written to the allocated physical data block. A log entry 904 has been added to the log page. Log entry 904 identifies logical block address #3795 as the target of the write operation. Old data contained in logical pointer entry #3795 is written in log entry 904, namely old hash entry #137 and physical data address #73. Updates to logical pointer entry #3795 are also reflected in log entry 904, namely logical pointer entry #3795 points to physical data address #79 and the hash pointer is set to NULL.

Figure 9D:
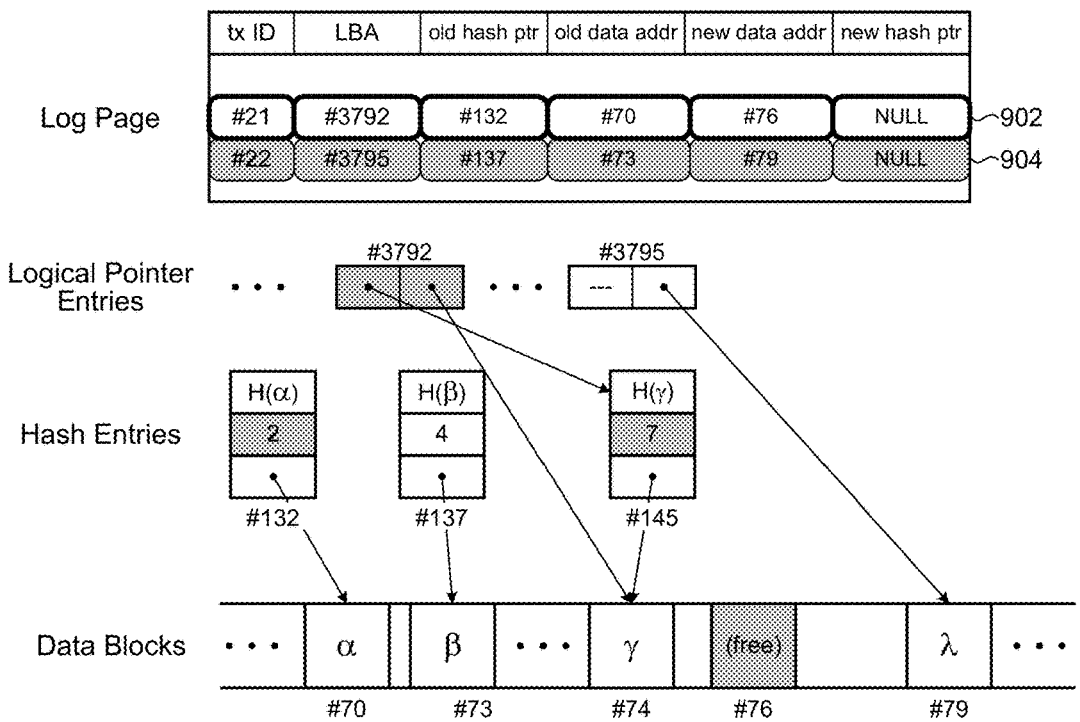

FIG. 9D illustrates the data state after replay processing of log entry 902 in accordance with FIG. 8. Recall that this log entry logged the overwrite operation involving logical data block #3792. The replay process has determined that data γ already exists (e.g., 806, 808, FIG. 8). Accordingly, the reference count in the hash entry that logical pointer entry #3792 previously pointed to, namely "old" hash entry #132, is decremented to indicate that there is one less reference to it. Logical pointer page #3792 is updated to point to existing hash entry #145 and to the physical data block #74 that contains data γ (e.g., 810, 812, FIG. 8). The reference count in hash entry #145 is incremented to reflect that another logical pointer entry points to it, and that there is another instance of data γ among the data objects in the storage system. The physical data block #76 that was allocated to store data γ is de-allocated. The log entry 902 may be deleted from the log page.

Figure 9E:
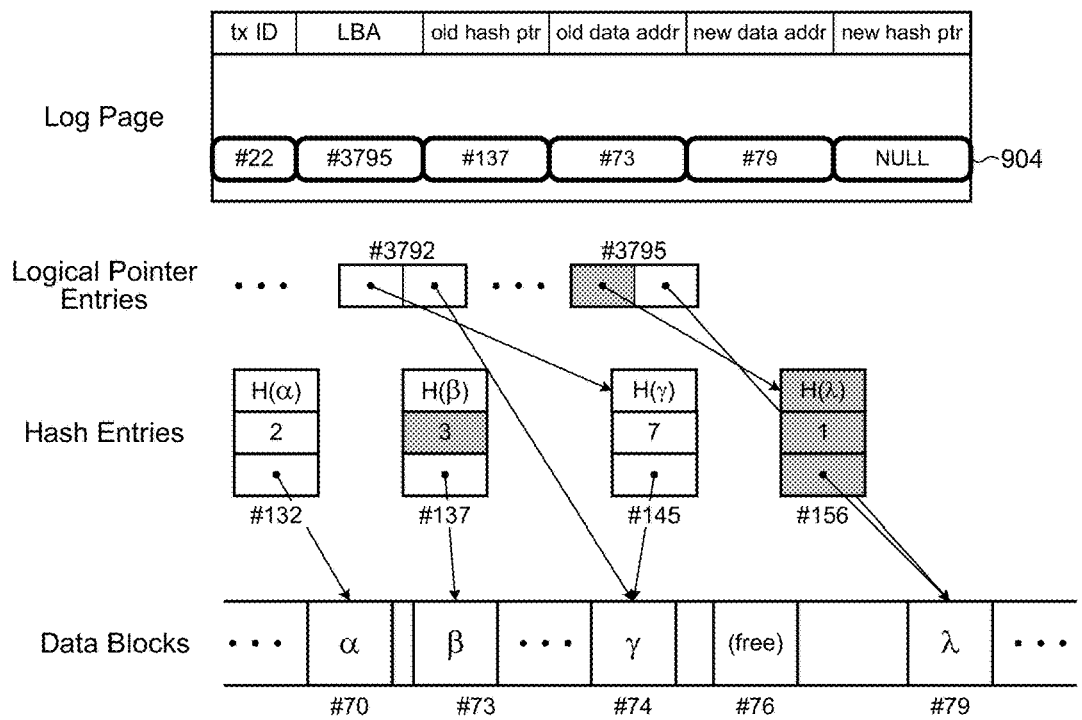

The replay shown in FIG. 9D represents an example of replaying an overwrite operation with data, namely data γ, that already exists in the storage system. FIG. 9E represents an example of replaying an overwrite operation with data, namely data λ, that does not already exist in the storage system.

FIG. 9E illustrates the data state after of replay processing of log entry 904 in accordance with FIG. 8. This log entry recorded the write operation involving logical data block #3795. The replay process has determined that data λ does not already exist (e.g., 808, 814, FIG. 8), and thus data λ may be deemed to be unique data. Accordingly, the reference count in the hash entry that logical pointer entry #3795 previously pointed to, namely "old" hash entry #137, is decremented to indicate that there is one less reference to it. A new hash entry #156 is allocated and inserted into a content map object. The new hash entry #156 stores the hash value H(λ) computed from data λ. Hash entry #156 points to the physical data block #79, which contains data λ, and its reference count is set to one. Logical pointer page #3795 is updated to point to new hash entry #156; the logical pointer page already points to physical data block #79. The log entry 904 may be deleted from the log page.

Figure 9F:
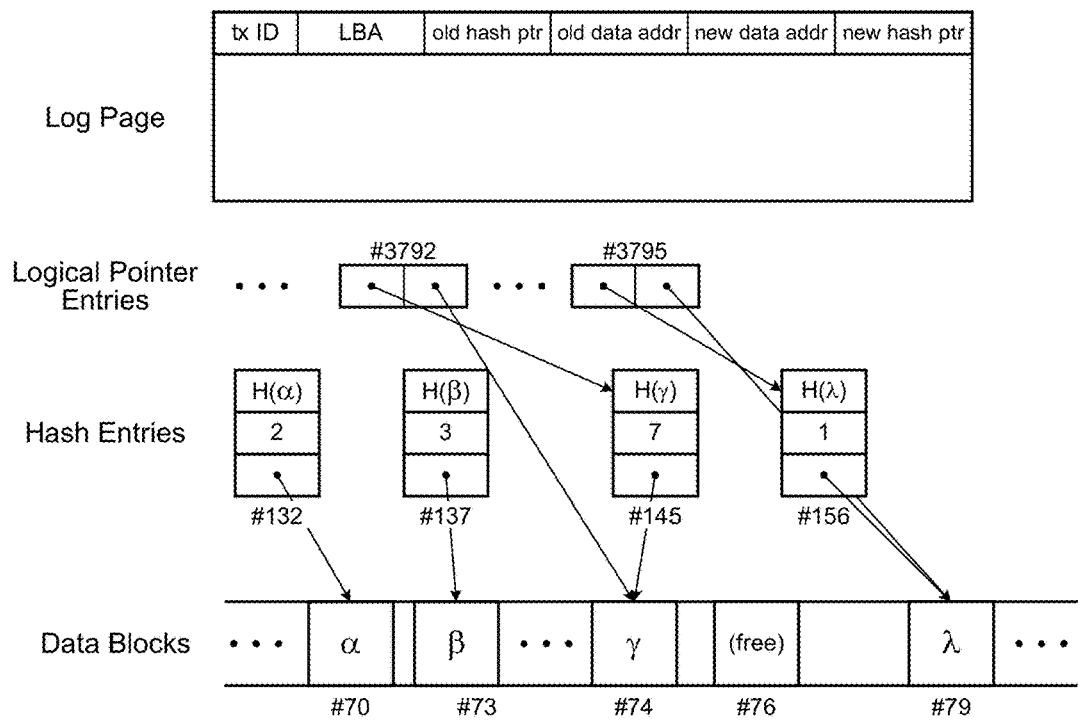

FIG. 9F shows the data state after all the log entries have been replayed. The discussion will now describe an example of a new write operation and replay processing of a log entry resulting from a new write operation.

Figure 9G:
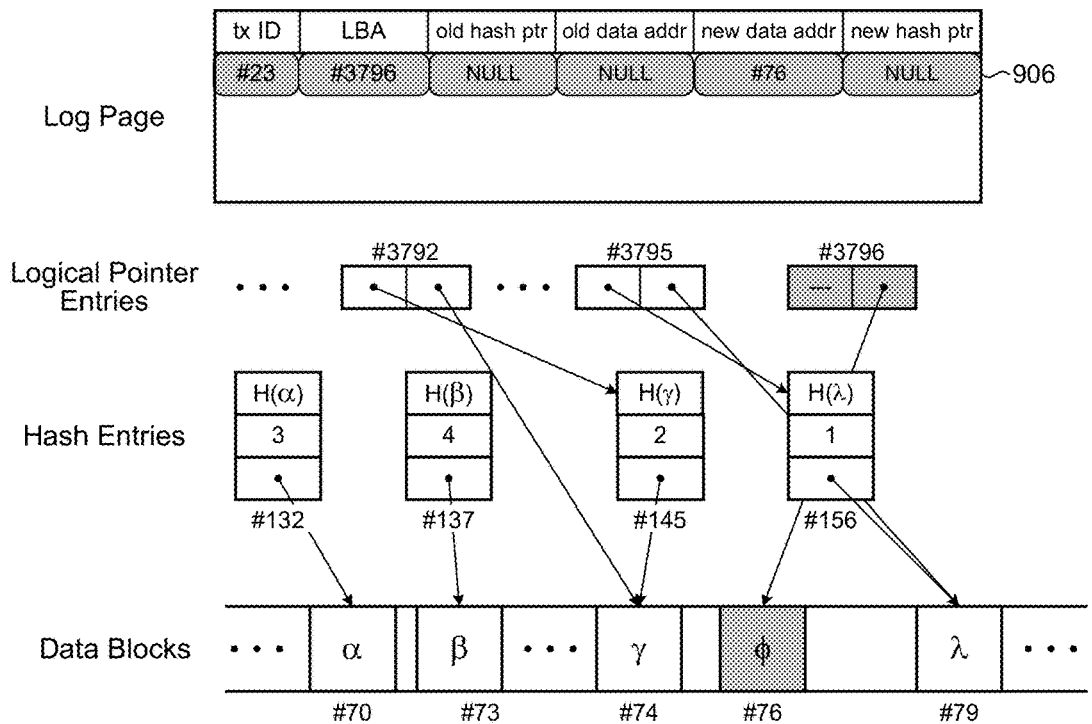
Figure 9H:
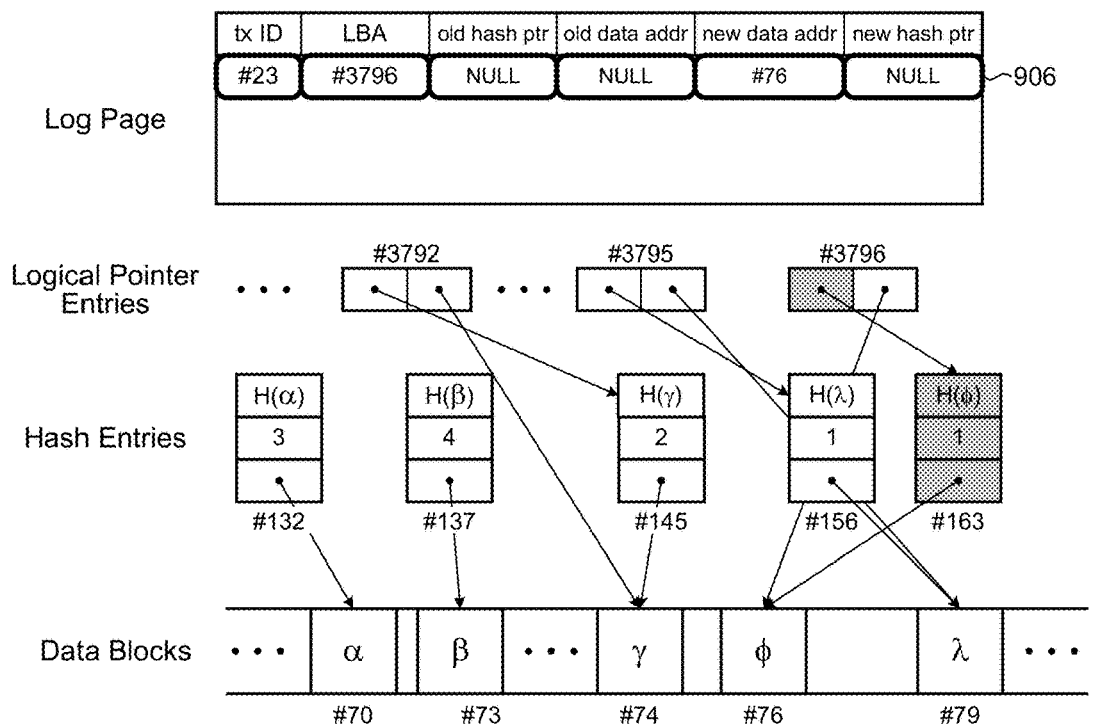

FIG. 9G illustrates the data state after processing a new write request. The new write operation includes data φ and specifies a new logical data block #3796 in the client data object as the target of the write operation. In accordance with the processing shown in FIG. 6, FIG. 9G shows a logical pointer entry associated with logical data block #3796 has been allocated. A physical data block #76 has been allocated and data φ written to the allocated physical data block. Since physical data block #76 has been de-allocated, it can be re-allocated, as in this example. A log entry 906 has been added to the log page. The log entry 906 identifies logical block address #3796 as the target of the write operation. There is no previous hash entry since the logical pointer entry #3796 is newly allocated. Accordingly, the log entry 906 shows NULL for the "old" hash entry information. The new logical pointer entry #3796 is initialized, and is reflected in the log entry 906, namely logical pointer entry #3796 now points to physical data address #76 and the hash pointer is set to NULL.

FIG. 9G illustrates the data state after replay processing of log entry 906 in accordance with FIG. 8. This log entry recorded the write operation involving logical data block #3796. The replay process has determined that data φ does not already exist, and may be deemed to be unique data. Accordingly, a new hash entry #163 is allocated and inserted into a content map object. The new hash entry #163 stores the hash value H(φ) computed from data φ. Hash entry #163 points to the physical data block that contains data 4, namely physical data block #76, and its reference count is set to one. Logical pointer page #3796 is updated to point to new hash entry #163; the logical pointer page already points to physical data block #76. The log entry 906 may be deleted from the log page.

The discussion will now turn to another aspect of the present disclosure, namely support for snapshots and clones. A snapshot is a read-only copy of a client data object, whereas a clone is a writable snapshot. A client can make changes to a clone without affecting the original client data object. A common approach maintains a base version of the client data object and a chain of deltas to represent snapshot versions. However, this design has several limitations: it is not scalable with respect to the number of snapshots; and it does not allow reclamation of space and deletion of data within snapshots ("true cloning"). The present disclosure can provide true cloning by maintaining reference counts of both the data that comprises the client data objects and the metadata, namely the data structures to support and manage deduplication of the data.

Figure 10:
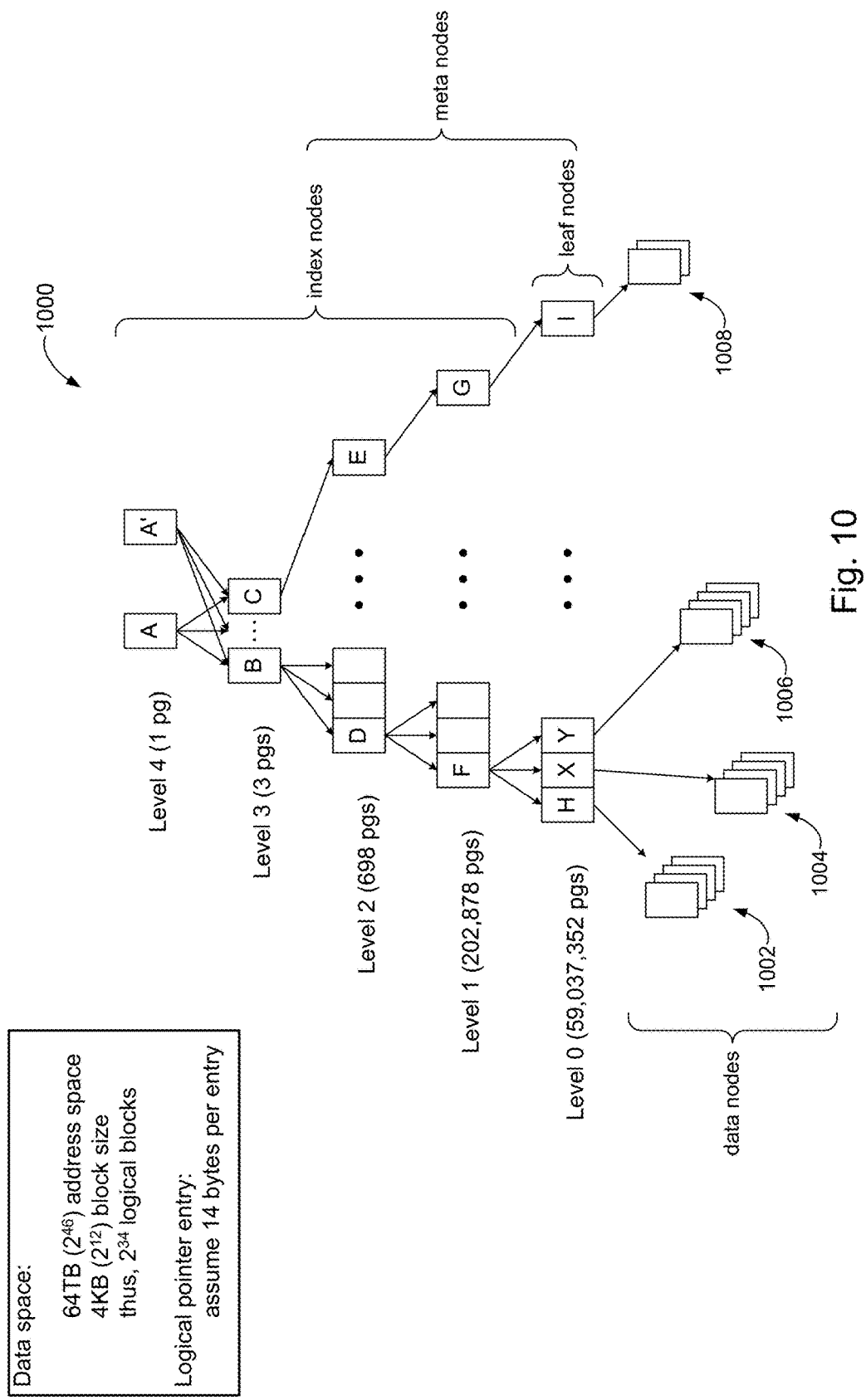
FIG. 10 shows a hierarchical configuration of logical pointer pages to support snapshots and clones in accordance with the present disclosure.

FIG. 10 illustrates a hierarchical arrangement of logical pointer pages (e.g., 422, FIG. 4) in accordance with some embodiments of the present disclosure to support snapshots or clones. The term snapshot will be used to refer to both snapshots and clones. The previously described size allocations for various data structures can be assumed without loss of generality. For example, we will assume an address space of 64 TB ($2^{46}$) for storing the data that comprise a client data object. The data will be divided into 4 KB ($2^{12}$) sized logical data blocks, for a total of 16 GB ($2^{34}$) logical data blocks. We will further assume that a logical pointer entry (e.g., 432, FIG. 4) is 14 bytes long, and that a logical pointer page 422 can hold 291 logical pointer entries 432.

In accordance with some embodiments, the logical pointer pages may be configured as a tree 1000 to represent the 16 GB of logical data blocks that comprise a client data object. In some embodiments, for example, the tree 1000 may be organized into five levels (level 4 to level 0) of logical pointer pages. The logical pointer pages that comprise level 4 to level 1 of the tree 1000 may constitute the "index" nodes A-G. The logical pointer pages at level 0 to level 1 may constitute the "leaf nodes" H-I of the tree 1000. The index nodes and the leaf nodes may be collectively referred to as "meta" nodes. The physical data blocks 1002-1008 pointed to by the leaf nodes H-I, which actually store the data, may be referred to as "data" nodes.

Each logical pointer page can point to 291 logical pointer pages at the next lower level. For the given size allocation, the number of logical pointer pages at each level is shown in FIG. 10. Logical pointer page A is referred to as the root of the tree 1000 at level 4. Three of its 291 logical pointer entries point to three level 3 logical pointer pages B-C. The logical pointer entries in the three level 3 logical pointer pages point to a total of 698 logical pointer pages D-E at level 2, and so on down to level 0. The logical pointer entries in the level 0 logical pointer pages H-I point to the physical data blocks 1002-1008, as describe above, for example, in FIG. 4. For example, the 291 logical pointer entries in logical pointer page H point to the 291 physical data blocks 1002 that correspond to logical data blocks 0-290 of the client data object. Likewise, logical pointer page X points to the 291 physical data blocks 1004 that correspond to logical data blocks 291-581 that comprise the client data object, logical pointer page Y points to the 291 physical data blocks 1006 that correspond to logical data blocks 582-872, and so on to logical pointer page I, which points to the last $2^{34}$ modulo 291 physical data blocks 1008 of the client data object.

It will be appreciated that for given a logical block address of a logical data block, the correct path of logical pointer pages from the root at level 4 to level 0 can be readily computed. In some embodiments, the address space at a given level may be divided into as many address subranges as there are logical pointer pages at the next level; for example, at level 4 there are three address subranges, at level 3 there are 698 address subranges, and so on. Traversal down the tree 1000 from a given level involves identifying which address subrange the logical block address falls into and going to the logical pointer page at the next level that corresponds to that identified address subrange.

FIG. 10 illustrates how a snapshot can be represented. When a snapshot is created, a new logical page pointer A' is defined at the root and contains a copy of logical pointer page A, defining a forest of two trees. Thus, a client data object that has one or more snapshots can be represented as a forest of logical pointer pages in accordance with the present disclosure.

Figure 11A:
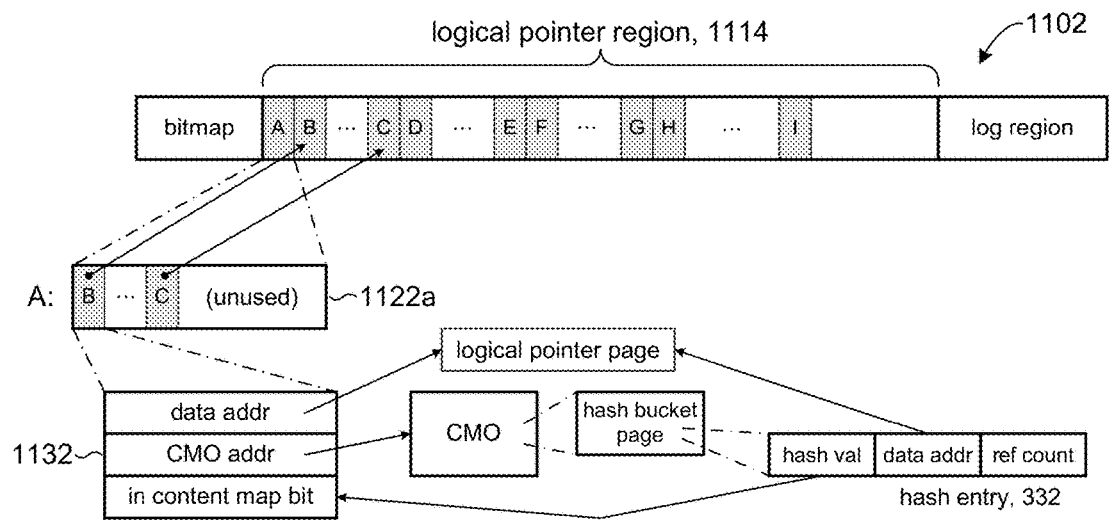
FIGS. 11A and 11B illustrate a logical map object configured to support a hierarchy of logical pointer pages in accordance some embodiments of the present disclosure.
Figure 11B:
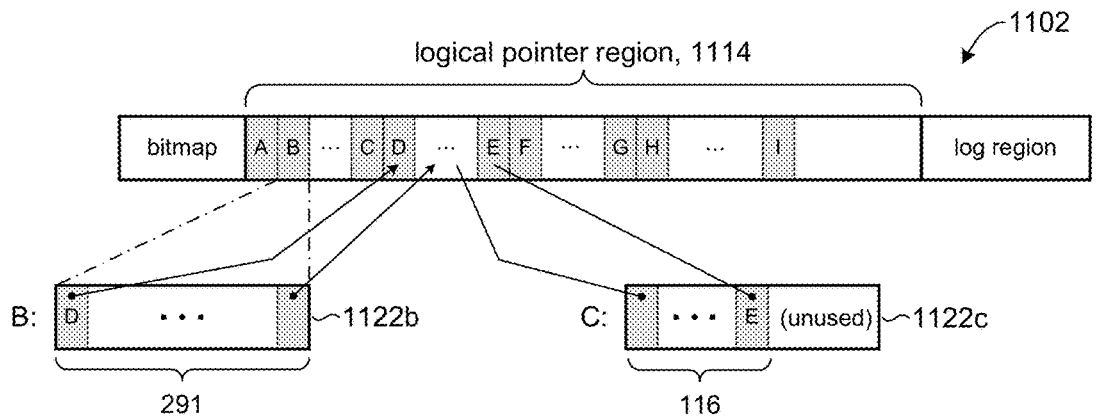

FIGS. 11A and 11B illustrate an example of a logical map object 1102 associated with a client data object and configured to support hierarchical logical pointer pages in accordance with some embodiments of the present disclosure. The figures show that the logical pointer pages corresponding to the index nodes A-G of tree 1000 shown in FIG. 10 can be stored in the logical pointer region 1114 of the logical map object 1102. The leaf nodes H-I point to the physical data blocks 1006, and are processed to access the physical data blocks as explained above in connection with FIG. 4. Processing of the index nodes A-G in accordance with the present disclosure will now be explained.

In accordance with some embodiments, the logical pointer entries 1132 that comprise a logical pointer page 1122a of an index node (e.g., index node A) may point to other logical pointer pages 1122a in the logical pointer region 1114 that correspond to other index nodes, instead of pointing to physical data blocks as described above for example in FIG. 4, thus defining the hierarchy of logical pointer pages. In accordance with the present disclosure, CMOs (e.g., 302, FIG. 3) may be used to manage the hierarchy of logical pointer pages. For example, a hash entry 322 may be associated with each logical pointer entry 1132. The hash entry 332 may be accessed using the address of the logical pointer page that references the hash entry, in this case the address of logical page pointer 1122a, in a manner similar to using the hash value to access a hash entry described above. Briefly, portions of the address of the logical pointer page may be used to identify a CMO and a hash bucket page within the identified CMO, and then a linear search or binary search may be performed to access the hash entry 332. The logical pointer page address may be stored in the CMO address field 444 of the logical pointer entry 1132. As will be explained below, the reference count field 346 in the hash entry 332 may serve as a reference count to manage snapshots during copy-on-write processing. The reuse of CMOs avoids having to create a separate data structure to manage the hierarchy of logical pointer pages.

It can be seen in FIG. 11A that many of the logical pointer entries 1132 in logical pointer page 1122a are unused since only three logical pointer entries are needed at level 4. Referring to FIG. 11B, some details of some logical pointer pages 1122b, 1122c for level 3 are shown. The logical pointer page 1122c for index node C, likewise, has unused address space. In some embodiments, the physical storage may be thinly provisioned, so unused address space does not consume physical data blocks.

The configuration of the logical map object 1102 shown in FIGS. 11A and 11B serves to illustrate how the logical map object 1102 may be configured to support the tree 1000 shown in FIG. 10. In practice, a minimal portion of the tree 1000 may be initially allocated in order to support a minimum object size. For example, suppose client data objects have an initial default size of 100 GB. Accordingly, when a logical map object is allocated for a new client data object, the allocated logical map object may be initialized with index nodes D, F, and H of the tree 1000. Initially, index node D serves as the root node, with additional index nodes being added as the client data object grows beyond 100 GB.

Figure 11C:
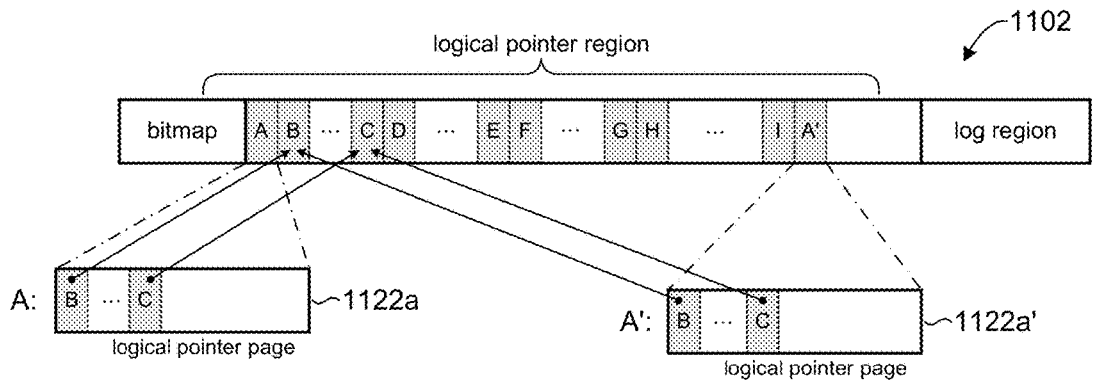
FIG. 11C illustrates an example of a snapshot in accordance with some embodiments of the present disclosure.

FIG. 11C shows the logical map object 1102 shown in FIG. 11A, but configured with a snapshot or clone of the client data object that the logical map object 1102 represents. When a snapshot of a parent object is created, the root index node of that parent is duplicated. For example, suppose the parent is the original copy of the client data object. The root index node A, namely logical pointer page 1122a, is duplicated to create logical pointer page 1122a'. This will become the root index node A' of the snapshot.

Logical pointer page 1122a' points to the same level 3 index nodes as logical pointer page 1122a; i.e., each level 3 index node has another root index node pointing to it, namely index node A'. Accordingly, the reference counter for each logical pointer page at level 3 must be incremented to reflect this fact. Thus, for each logical pointer entry in the logical pointer pages at level 3, the reference counter in the hash entry pointed to by that logical pointer entry is incremented. Reference counters at the lower levels also need to be incremented. However, as will be explained below, such a time-consuming and potentially unneeded effort can be deferred to a later time on an as-needed basis. Logical pointer page 1122a provides I/O access to the original copy of the client data object, while logical pointer page 1122a' provides I/O access to a snapshot copy of the client data object.

The discussion will now turn to processing write requests, in accordance with some embodiments of the present disclosure, using the hierarchically structured logical pointer pages described in connection with FIGS. 10 and 11A-11C. When a write request is received, copy-on-write (COW) processing may be performed prior to performing the write operation. After a clone of a data object is created, when either the old data object or the new data object is updated, COW may be performed to preserve the semantics of snapshots and clones. In accordance with the present disclosure, the COW process may be deferred and performed as needed.

Figure 12:
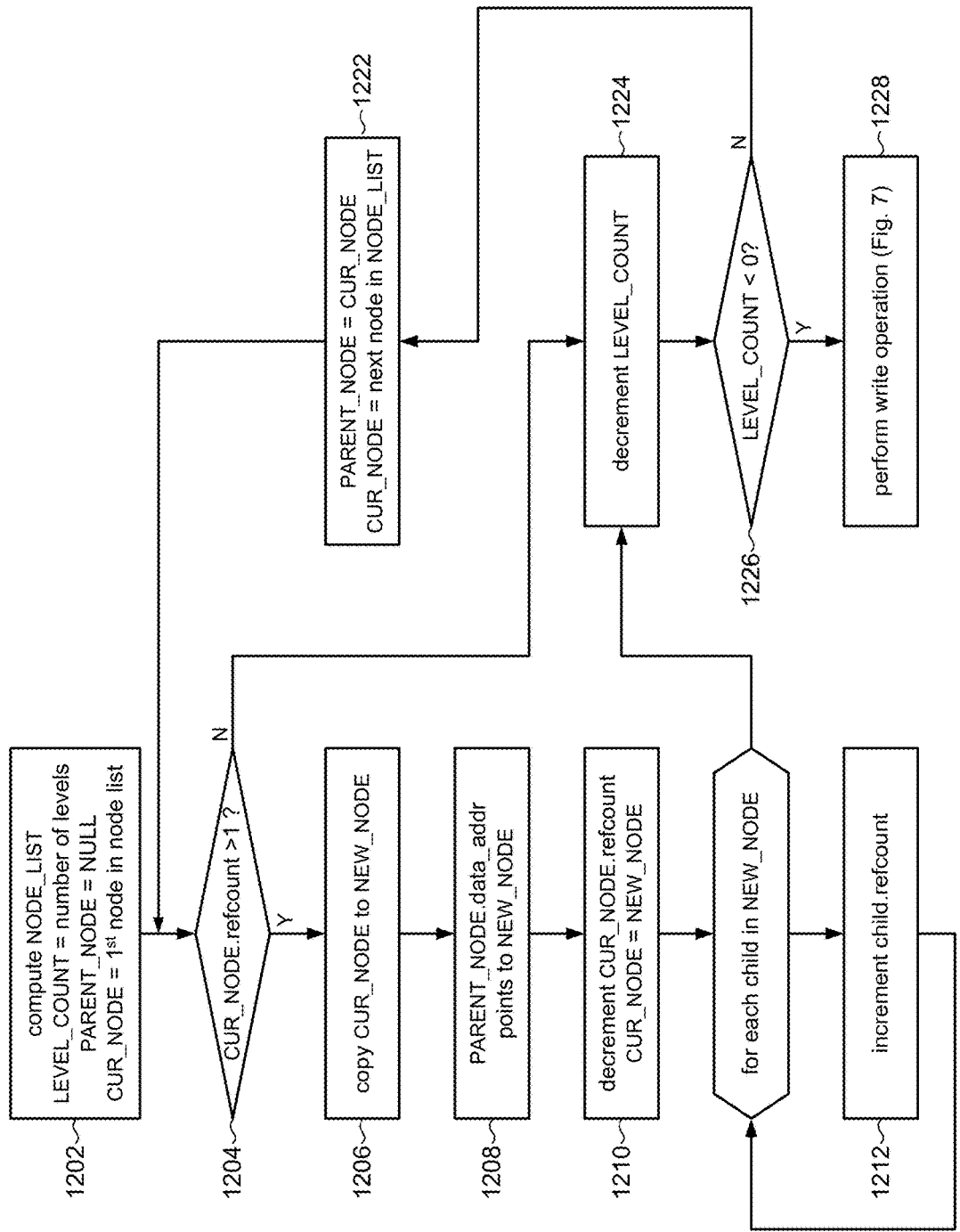
FIG. 12 represents a high level description of COW processing in accordance some embodiments of the present disclosure.

FIG. 12 shows a high level process for copy-on-write in accordance with the present disclosure, in response to receiving a write operation. In some embodiments, for example, the daemon process (e.g., running in host 102, FIG. 1) may include computer executable program code configured to operate the host to perform copy-on-write processing. The sequence shown in FIGS. 13A-13C illustrates an example of the processing.

Figure 13A:
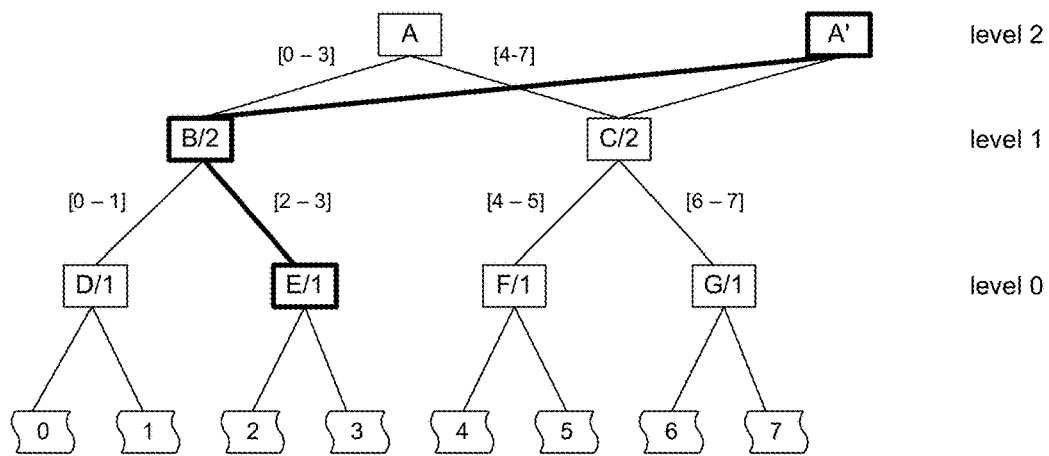
FIGS. 13A-13C represent an illustrative example of sequences showing changes to data structures during COW processing in accordance with the present disclosure.
Figure 13B:
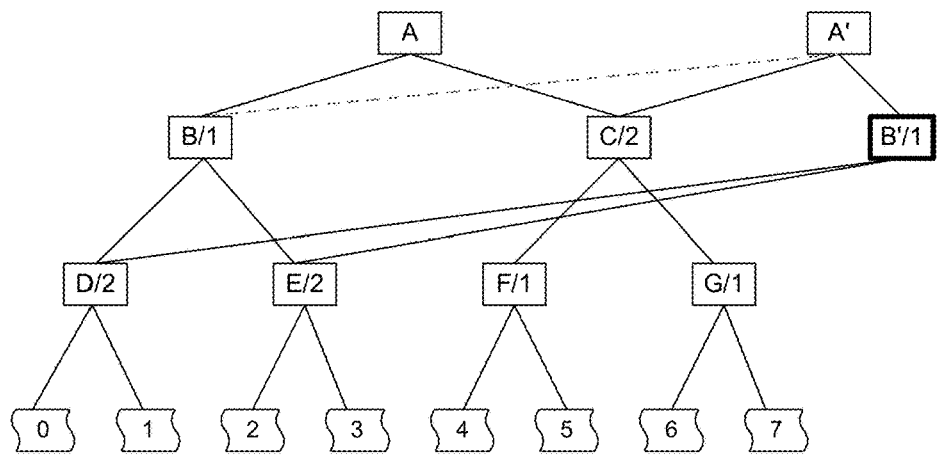
Figure 13C:
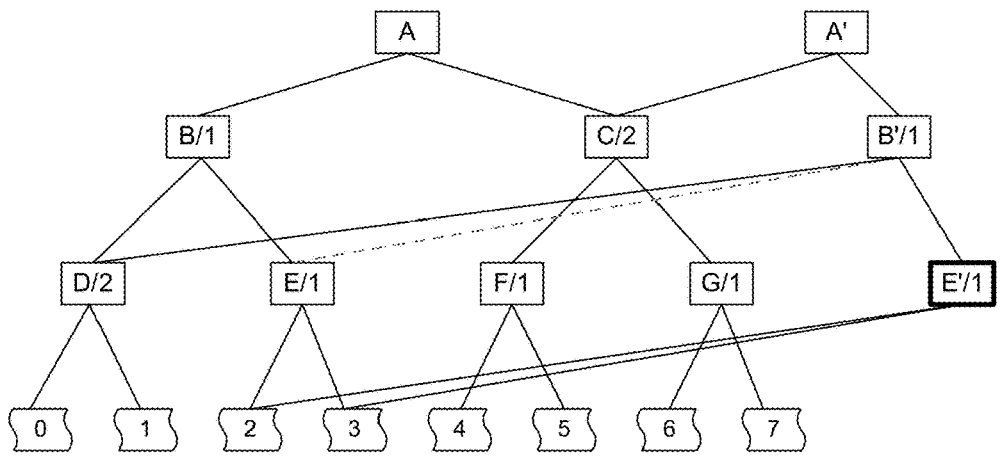

The tree structure illustrated in FIG. 13A can provide an example to explain the copy-on-write process. FIG. 13A shows a three-level tree (levels 2, 1, 0), having a root A at level 2, which may represent the original data object, and another root A', which may represent a snapshot of the original data object. We can assume without loss of generality, there are 8 logical data blocks in the data object. The index nodes B-G are shown with their respective reference counts. Index nodes B and C, for example, have reference counts of 2 to reflect the fact that roots A and A' reference them. The address subranges at each level are shown in brackets for an address space of $2^3$.

Suppose a write request specifies snapshot data object A' and logical block address 2. The copy-on-write process may proceed as follows:

At 1202, some initial values may be set up for the process. In some embodiments, for example, a NODE_LIST of the meta nodes (index and leaf) may be computed from the offset parameter that specifies the logical block address. The list of meta nodes identifies the path of index nodes from the root to the leaf node that points to the physical data block that is the target of the write operation. In the example, the write request specifies a logical block address of 2. Accordingly, the NODE_LIST determined using the address subranges includes index nodes A', B, and leaf node E. Additional values that may be initialized include: LEVEL_COUNT set to the root level 2; PARENT_NODE set to NULL, and CUR_NODE set to the first node in the NODE_LIST, namely A'.

At 1204, if the reference count associated with CUR_NODE is >1, then processing may proceed to 1206. Otherwise, processing may go to 1222. A reference count >1 may serve to indicate the node is part of a snapshot or clone. In the first iteration, CUR_NODE is root A', so the reference count is going to be 1, since by definition nothing points to the root. Accordingly processing may proceed to 1224.

At 1224, LEVEL_COUNT is decremented in order to move processing down to the next level. At 1226, if LEVEL_COUNT falls below zero, then that indicates we are at the level of the data nodes, and copy on write processing is complete. Processing may proceed to 1228 in order to commence with write processing (e.g., per FIG. 7).

In the first iteration, LEVEL_COUNT goes from 2 to 1, so the process may go to 1222, where PARENT_NODE and CUR_NODE are updated. In the first iteration, PARENT_NODE is set to root A' (because CUR_NODE was set to A') and CUR_NODE is set to the next node in the NODE_LIST, namely index node B. The process may loop back to the top to 1204 for a second iteration.

In the second iteration, CUR_NODE now points to index node B, which has a reference count 2, so the process will flow from 1204 to 1206. At 1206, a new logical pointer page is allocated (NEW_NODE B'), and the contents pointed to by CUR_NODE, namely index node B, are copied to the NEW_NODE B'. FIG. 13B shows the addition of B; note that its reference count is initialized to 1.

At 1208, the PARENT_NODE (root node A' in this iteration) is made to point to the NEW_NODE B'. FIG. 13B shows that A' is now pointing to B', and no longer to B. Since, index node B' is a copy of B, index node B' points to the same children as B, namely index nodes D and E.

At 1210, the reference count in CUR_NODE, which is still pointing to index node B, is decremented to reflect that there is one less reference to B. FIG. 13B reflects the updated reference count in B. For bookkeeping purposes, which will become relevant below, CUR_NODE is set to NEW_NODE, so CUR_NODE now points to B'.

Processing may proceed to the FOR loop to process each child of NEW_NODE B', where at 1212, the reference count in each child, namely index nodes D and E, is incremented. FIG. 13B reflects the updated reference counts in D and E.

Processing after the FOR loop may proceed to 1224, where LEVEL_COUNT is decremented (to move down to the next level); LEVEL_COUNT is now at level 0. The process may go to 1222 (via 1226), where PARENT_NODE and CUR_NODE are updated. PARENT_NODE is updated from A' to B; recall at 1210, CUR_NODE was set to point to NEW_NODE B'. CUR_NODE is set to the next node in the NODE_LIST, namely index node E. The process may loop back to the top at 1204 for a third iteration.

In the third iteration, CUR_NODE points to index node E, which now has a reference count 2, so the process will flow from 1204 to 1206. At 1206, a new logical pointer page is allocated (NEW_NODE E'), and the contents pointed to by CUR_NODE (index node E) are copied to the NEW_NODE E'. FIG. 13C shows the addition of index node E; note its reference count is initialized to 1.

At 1208, the PARENT_NODE (root node B' at this point) is made to point to the NEW_NODE E'. FIG. 13C shows that B' is now pointing to E', and not to E. Since, index node E' is a copy of E, index node E' points to the same children as E, namely data nodes 2 and 3.

At 1210, the reference count in CUR_NODE, which is still pointing to E, is decremented to reflect that there is one less reference to it. FIG. 13C reflects the updated reference count in E.

Processing may proceed to the FOR loop to process each child of NEW_NODE node E', where at 1212, the reference count in each child, namely data nodes 2 and 3, is incremented to indicate they have one more reference to them.

Processing from the FOR loop may proceed to 1224, where LEVEL_COUNT is decremented to move down to the next level; LEVEL_COUNT is now at level −1. This indicates we are now at the level of the data nodes. Accordingly, copy-on-write processing has completed and the process may flow to 1228 to commence the write operation.

It can be seen that when a shared index node is copied (e.g., its reference count is >1, as in index node B), all its children pages are marked as shared (e.g., their reference counts are incremented, as in index nodes D and E). When a new index node is created during copy-on-write (e.g., as in index node B' at 1206), it is marked as unshared (e.g., reference count initialized to 1). When handling a write in the I/O path, if an index node is marked as shared it is always COW'd to a new page. Thus only those index nodes involved in accessing the target logical data block of the write operation need to be updated in terms of their reference counts. In situations where a data object may contain many thousands of logical data blocks, and is cloned many times, this COW-as-needed processing in accordance with the present disclosure can save a lot of time and avoid unnecessary I/O.

An advantage of this design is that snapshots or clones can be created in O(1) time irrespective of how many snapshots/clones already exist. Snapshots and clones are also first-class citizens, because system performance is unrelated to the number of snapshots or clones. Snapshots and clones also share the same on-disk structure; a snapshot can become a clone, if read-write access is required. Another advantage is the architecture supports the feature of "true clones," where space can be reclaimed after removing data from all clones. "True clones" can be important in some use cases. For example, some data retention policies require data to be deleted after they expire, which requires certain old data be deleted from all clones/snapshots after a certain period. If a conventional delta-based snapshot is used, they have to be recopied in order to satisfy the data retention policy, while "true clones" allow this to be done efficiently.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, solid state drive (SSD), non-volatile random access memory (NVRAM), network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for storing client data objects in a storage system, the method comprising:
    storing, by a computer system, deduplicated data that comprise a plurality of client data objects among a plurality of physical data blocks that comprise the storage system;
    associating, by the computer system, each physical data block with a first mapping object comprising a computed value computed using data stored in said each physical data block, an address of said each physical data block, and a reference count; and
    associating, by the computer system, each logical data block that comprises a client data object with a respective second mapping object comprising an address of a physical data block that stores the same data that comprises said each logical data block and a pointer to a first mapping object associated with the physical data block,
    the reference count in each first mapping object indicative of how many other second mapping objects point to said each first mapping object.

2. The method of claim 1, wherein the storage system is a distributed storage system, the method further comprising distributing the plurality of physical data blocks among a plurality of storage nodes that comprise the distributed storage system.

3. The method of claim 1, further comprising performing a SHA-1 computation on the data stored in said each physical data block to compute the computed value.

4. The method of claim 1, storing a plurality of content map objects, each content map object comprising a plurality of first mapping objects.

5. The method of claim 4, distributing the plurality of content map objects among a plurality of storage nodes that comprise a distributed storage system.

6. The method of claim 4, further comprising accessing one of the first mapping objects using a given computed value, including using a first portion of the computed value to access a content map object that includes said one of the first mapping objects.

7. The method of claim 1, distributing a plurality of second mapping objects among a plurality of storage nodes that comprise a distributed storage system.

8. The method of claim 1, wherein the storage system is a distributed storage system, the method further comprising distributing the plurality of physical data blocks and a plurality of second mapping objects among a plurality of storage nodes that comprise the distributed storage system; storing a plurality of first mapping objects among a plurality of content map objects; and distributing the plurality of content map objects among the plurality of storage nodes.

9. A non-transitory computer-readable storage medium containing instructions for controlling a computer system to:
store deduplicated data that comprise a plurality of client data objects among a plurality of physical data blocks that comprise the storage system;
associate each physical data block with a first mapping object comprising a computed value computed using data stored in said each physical data block, an address of said each physical data block, and a reference count; and
associate each logical data block that comprises a client data object with a respective second mapping object comprising an address of a physical data block that stores the same data that comprises said each logical data block and a pointer to a first mapping object associated with the physical data block,
the reference count in each first mapping object indicative of how many other second mapping objects point to said each first mapping object.

10. The non-transitory computer-readable storage medium of claim 9, wherein the storage system is a distributed storage system, wherein the non-transitory computer-readable storage medium further comprises instructions for controlling the computer system to distribute the plurality of physical data blocks among a plurality of storage nodes that comprise the distributed storage system.

11. The non-transitory computer-readable storage medium of claim 9, further comprising instructions for controlling the computer system to store a plurality of first mapping objects among a plurality of content map objects.

12. The non-transitory computer-readable storage medium of claim 11, further comprising instructions for controlling the computer system to distribute the plurality of content map objects among a plurality of storage nodes that comprise a distributed storage system.

13. The non-transitory computer-readable storage medium of claim 9, further comprising instructions for controlling the computer system to distribute a plurality of second mapping objects among a plurality of storage nodes that comprise a distributed storage system.

14. An apparatus comprising:
one or more computer processors; and
a computer-readable storage medium comprising instructions for controlling the one or more computer processors to:
store deduplicated data that comprise a plurality of client data objects among a plurality of physical data blocks that comprise the storage system;
associate each physical data block with a first mapping object comprising a computed value computed using data stored in said each physical data block, an address of said each physical data block, and a reference count; and
associate each logical data block that comprises a client data object with a respective second mapping object comprising an address of a physical data block that stores the same data that comprises said each logical data block and a pointer to a first mapping object associated with the physical data block,
the reference count in each first mapping object indicative of how many other second mapping objects point to said each first mapping object.

15. A method for deduplicating data in a storage system, comprising:
storing a plurality of logical map objects (LMOs), each LMO having a plurality of logical pointer entries (LPEs);
associating an LMO with a client data object (CDO), including allocating physical data blocks from a storage system, storing data that comprise the CDO to the allocated physical data blocks, and storing addresses of the allocated physical data blocks to data address fields of respective LPEs of the associated LMO; and
deduplicating data stored in the storage system, including identifying one or more LPEs in a given LMO, and for each LPE deduplicating data stored in a given physical data block referenced in the data address field of said each LPE, including:
computing a hash value from the data stored in the given physical data block;
using the hash value to access a content map object (CMO) from a plurality of CMOs;
using the hash value to search for a hash entry (HE) in the accessed CMO;
in response to finding an HE in the accessed CMO, copying a data address field in the found HE to the data address field in the given LPE, storing an address of the accessed CMO to a CMO address field in the given LPE, incrementing a reference count field in the found HE, and de-allocating the given physical data block; and
in response to not finding an HE in the accessed CMO, adding an HE to the accessed CMO, copying the data address field in the given LPE to the data address field in the added HE, and setting the reference count in the added HE to an initial value.

16. The method of claim 15, further comprising recording log entries of write operations made to the storage system, wherein deduplicating data stored in the storage system includes using the log entries to identify the one or more LPEs.

17. The method of claim 15, wherein the hash value is a SHA-1 hash value.

18. The method of claim 15, further comprising overwriting data in a logical data block of the CDO with new data, including:
accessing an LPE that corresponds to the logical data block;
in response to an indication that data accessible by the accessed LPE has been deduplicated, allocating a physical data block from the plurality of physical data blocks, storing the new data to the allocated physical data block, storing original content of the accessed LPE to a log entry, updating the content of the accessed LPE by storing an address of the allocated physical data block to the data address field in the accessed LPE, and storing the updated content to the log entry; and
in response to an indication that data accessible by the accessed LPE has not been deduplicated, storing the new data in a physical block addressed by the data address field in the accessed LPE.

19. The method of claim 15, further comprising writing data to a new logical data block of the CDO, including:
allocating a physical data block from the plurality of physical data blocks;
storing the new data in the allocated physical data block;

adding an LPE to an LMO associated with the CDO;
storing an address of the allocated physical data block to the data address field of the added LPE; and
storing content of the added LPE to a log entry.

20. The method of claim 15, wherein the storage system is a distributed storage system, the method further comprising distributing the plurality of physical data blocks and the plurality of LMOs among a plurality of storage nodes that comprise the distributed storage system; and distributing the plurality of CMOs among the plurality of storage nodes.

* * * * *